US010667978B2

(12) United States Patent
Takizawa et al.

(10) Patent No.: US 10,667,978 B2
(45) Date of Patent: Jun. 2, 2020

(54) WALKING ASSIST DEVICE AND METHOD OF CONTROLLING WALKING ASSIST DEVICE

(71) Applicant: HONDA MOTOR CO., LTD., Tokyo (JP)

(72) Inventors: Daijiro Takizawa, Saitama (JP); Naoki Fujihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/026,718

(22) Filed: Jul. 3, 2018

(65) Prior Publication Data

US 2019/0046390 A1 Feb. 14, 2019

(30) Foreign Application Priority Data

Aug. 10, 2017 (JP) ................................ 2017-155846
Aug. 10, 2017 (JP) ................................ 2017-155847

(51) Int. Cl.
*B60K 1/00* (2006.01)
*A61H 3/04* (2006.01)

(52) U.S. Cl.
CPC ......... *A61H 3/04* (2013.01); *A61H 2003/043* (2013.01); *A61H 2003/046* (2013.01); *A61H 2201/1207* (2013.01)

(58) Field of Classification Search
CPC ...... A61H 3/04; A61H 3/00; A61H 2003/046; A61H 2003/043; A61H 2201/1207; A61H 2201/12; A45B 3/00
See application file for complete search history.

(56) References Cited

U.S. PATENT DOCUMENTS 6,708,705 B2 * 3/2004 Nasco, Sr. ............... A45B 9/00 135/66
7,635,037 B2 * 12/2009 Treadwell .............. B62B 5/005 180/19.3

(Continued)

FOREIGN PATENT DOCUMENTS

CN 103892533 A 7/2014
JP H09-327315 A 12/1997

(Continued)

OTHER PUBLICATIONS

Dec. 11, 2018, Japanese Office Action issued for related JP Application No. 2017-155847.

(Continued)

*Primary Examiner* — James M Dolak
(74) *Attorney, Agent, or Firm* — Paratus Law Group, PLLC

(57) ABSTRACT

A walking assist device, includes: a first motor; a second motor; a main body case accommodating the first motor and the second motor; a holding portion provided in the main body case and held by a walker; a plurality of driving wheels, each of which is rotatable around a rotating shaft provided on a circumference in common, and a controller that controls the first motor and the second motor according to intention information regarding a movement of the walker. The plurality of rotating shafts are rotatably supported by a hub case, the hub case is supported by the main body case to be rotatable around a center of the plurality of rotating shafts as a pivot, the first motor is connected to the plurality of driving wheels, and the second motor is connected to the hub case and is connected to the main body case.

9 Claims, 16 Drawing Sheets

(56) References Cited

U.S. PATENT DOCUMENTS

| | | | | |
|---|---|---|---|---|
| 8,418,705 | B2 * | 4/2013 | Ota | A61H 3/04 135/71 |
| 8,500,143 | B2 * | 8/2013 | Yu | A61H 3/04 180/19.3 |
| 8,564,444 | B2 * | 10/2013 | Ota | A61L 2/0088 340/539.1 |
| 8,627,909 | B2 * | 1/2014 | Chang | A61H 3/04 135/67 |
| 8,925,563 | B2 * | 1/2015 | Ota | A61H 3/04 135/85 |
| 9,186,992 | B2 * | 11/2015 | Katayama | B62D 51/04 |
| 9,463,836 | B2 * | 10/2016 | Kubo | A61H 3/04 |
| 9,523,983 | B2 * | 12/2016 | Chamberlain | G05D 1/0242 |
| 9,603,761 | B2 * | 3/2017 | Fukunaga | A61H 3/04 |
| 9,839,570 | B2 * | 12/2017 | O'Sullivan | A61H 3/04 |
| 10,219,969 | B2 * | 3/2019 | Yu | A61H 3/04 |
| 2012/0029696 | A1 | 2/2012 | Ota et al. | |
| 2013/0041507 | A1 | 2/2013 | Ota et al. | |

FOREIGN PATENT DOCUMENTS

| | | | |
|---|---|---|---|
| JP | 2011-062463 | A | 3/2011 |
| JP | 2012-143488 | A | 8/2012 |
| JP | 2015-083102 | A | 4/2015 |
| JP | 2016-034809 | A | 3/2016 |
| JP | 2016-105770 | A | 6/2016 |

OTHER PUBLICATIONS

Apr. 10, 2020, Chinese Office Action issued for related CN Application No. 201810893674.7.

* cited by examiner

WALKING ASSIST DEVICE AND METHOD OF CONTROLLING WALKING ASSIST DEVICE

CROSS-REFERENCE TO RELATED APPLICATION (S)

This application claims priority from Japanese Patent Application Nos. 2017-155846 and 2017-155847 filed on Aug. 10, 2017, the entire contents of which are incorporated herein by reference.

FIELD

The present invention relates to a walking assist device that assists movement of a walker and a method of controlling a walking assist device.

BACKGROUND

A walking assist device that assists movement of a walker is known. For example, JP-A-9-327315 discloses a walking assist device. The walking assist device includes: a four-wheel carriage; a motor that drives driving wheels of the carriage; and a stick that is vertically provided on the carriage to be tiltable in a front-rear direction, and the walking assist device self-propels according to a forward/rearward operation of the stick.

However, the walking assist device disclosed in JP-A-9-327315 merely self-propels by rotation of the driving wheels. Therefore, the walking assist device is limited to use in a flat walkway (including a tilted walkway) having little unevenness and has a problem in adaptability to walkways.

SUMMARY

The present invention is to provide a walking assist device having excellent adaptability to walkways and a method of controlling a walking assist device.

The invention provides following aspects (1) to (18). In parentheses, elements corresponding to those in an embodiment described below are shown as an example, and the present invention is not limited thereto.

(1) A walking assist device (walking assist device 1) for assisting movement of a walker, including:

a first motor (first motor 10);

a second motor (second motor 20);

a main body case (main body case 30) that accommodates the first motor and the second motor;

a holding portion (holding portion 40) that is provided in the main body case and is held by the walker;

a plurality of driving wheels (driving wheels 50), each of which is rotatable around a rotating shaft (rotating shaft 51) provided on a circumference in common, and a controller (controller 120) that controls the first motor and the second motor according to intention information regarding the movement of the walker, wherein the plurality of rotating shafts are rotatably supported by a hub case (hub case 60), the hub case is supported by the main body case to be rotatable around a center of the plurality of rotating shafts as a pivot (pivot 61), the first motor is connected to the plurality of driving wheels to be capable of transmitting power, and the second motor is connected to the hub case to be capable of transmitting power and is connected to the main body case to be capable of transmitting power.

(2) The walking assist device according to (1), wherein the controller controls the first motor such that movement in a traveling direction of the walking assist device is assisted, and controls the second motor such that a center of gravity in the traveling direction of the walking assist device is balanced.

(3) The walking assist device according to (1) or (2), wherein an irreversible rotation transmission member (irreversible rotation transmission member 110) is provided on a power transmission path from the second motor to the hub case and the main body case, the irreversible rotation transmission member includes an input shaft (input shaft 111), an output shaft (output shaft 112), and an outer ring member (outer ring member 113), a torque of the input shaft is transmitted to the output shaft, a torque of the output shaft is transmitted to the outer ring member without being transmitted to the input shaft, in a state where the output shaft is fixed, the input shaft does not rotate and rotation of the outer ring member is allowed, a stator (stator 22) of the second motor is connected to the input shaft, the main body case is connected to the output shaft, and the hub case is connected to the outer ring member through a rotor (rotor 23) the second motor.

(4) The walking assist device according to any one of (1) to (3), wherein the first motor and the second motor are disposed outside of a revolution circumferential track of the plurality of driving wheels supported by the hub case.

(5) The walking assist device according to any one of (1) to (4), further including:

a rotation torque transmission mechanism (rotation torque transmission mechanism 70) that transmits a torque from the first motor to the plurality of driving wheels;

a revolution torque transmission mechanism (revolution torque transmission mechanism 90) that transmits a torque from the second motor to the hub case; and a balance torque transmission mechanism (balance torque transmission mechanism 100) that transmits the torque from the second motor to the main body case, wherein when seen from the traveling direction of the walking assist device, the revolution torque transmission mechanism is disposed on a first side in a width direction of the walking assist device, the balance torque transmission mechanism is disposed on a second side that is opposite to the first side in the width direction of the walking assist device, and the plurality of driving wheels and the rotation torque transmission mechanism are disposed between the revolution torque transmission mechanism and the balance torque transmission mechanism.

(6) The walking assist device according to (5), wherein in the rotation torque transmission mechanism, an upstream side rotation torque transmission mechanism (upstream side rotation torque transmission mechanism 71) and a downstream side rotation torque transmission mechanism (downstream side rotation torque transmission mechanism 72) are connected to each other to be capable of transmitting power through a through shaft (through shaft 73) that passes through the pivot of the hub case, and when seen from the traveling direction of the walking assist device, the plurality of driving wheels are provided substantially at a center in the width direction of the walking assist device, one of the upstream side rotation torque transmission mechanism and the downstream side rotation torque transmission mechanism is disposed between the revolution torque transmission mechanism and the plurality of driving wheels, and another one of the upstream side rotation torque transmission mechanism and the downstream side rotation torque transmission mechanism is disposed between the balance torque transmission mechanism and the plurality of driving wheels.

(7) The walking assist device according to any one of (1) to (6), further including:

a braking mechanism (braking mechanism 80) for stopping rotation of the plurality of driving wheels.

(8) The walking assist device according to any one of (1) to (7), wherein the main body case includes a hook portion (hook portion 36) for hanging a luggage.

(9) The walking assist device according to any one of (1) to (8), wherein a sensor device (main body tilting detection sensor 122) or an input device (operation lever 41) for obtaining the intention information regarding the movement of the walker is provided in the holding portion.

(10) The walking assist device according to any one of (1) to (9), wherein in the traveling direction of the walking assist device, the first motor and the second motor are disposed between one end portion and another end portion in a revolution circumferential track of the plurality of driving wheels supported by the hub case.

(11) The walking assist device according to (5) or (6), wherein the main body case includes a motor accommodation portion (motor accommodation portion 31) that accommodates the first motor and the second motor, a revolution torque transmission mechanism accommodation portion (revolution torque transmission mechanism accommodation portion 32) that is connected to the first side of the motor accommodation portion in the width direction and accommodates the revolution torque transmission mechanism, a balance torque transmission mechanism accommodation portion (balance torque transmission mechanism accommodation portion 34) that is connected to the second side of the motor accommodation portion in the width direction and accommodates the balance torque transmission mechanism, and a cylindrical portion (cylindrical portion 35) that connects the holding portion and an upper portion of the motor accommodation portion o each other, a battery (battery 130) that is electrically connected to the first motor and the second motor is disposed in the cylindrical portion, and the plurality of driving wheels supported by the hub case are disposed below the motor accommodation portion and between the revolution torque transmission mechanism accommodation portion and the balance torque transmission mechanism accommodation portion in the width direction of the walking assist device.

(12) A method of controlling a walking assist device (walking assist device 1), wherein the walking assist device includes:

a first motor (first motor 10);

a second motor (second motor 20);

a main body case (main body case 30) that accommodates the first motor and the second motor;

a holding portion (holding portion 40) that is provided in the main body case and is held by a walker;

a plurality of driving wheels (driving wheels 50), each of which is rotatable around a rotating shaft (rotating shaft 51) provided on a circumference in common; and a hub case (hub case 60) that rotatably supports the plurality of rotating shafts and is supported by the main body case to be rotatable around a center of the rotating shafts as a pivot (pivot 61), the first motor is connected to the plurality of driving wheels to be capable of transmitting power, the second motor is connected to the hub case to be capable of transmitting power and is connected to the main body case to be capable of transmitting power, and the method includes performing a traveling assist control (traveling assist control S1) of controlling the first motor according to intention information regarding movement of the walker such that movement in a traveling direction of the walking assist device is assisted.

(13) The method of controlling a walking assist device according to (12), further including performing a balance control (balance control S2) of controlling the second motor such that a center of gravity in the traveling direction of the walking assist device is balanced.

(14) The method of controlling a walking assist device according to (13), wherein when the driving wheels come into contact with a step that is difficult to climb over, the main body case and the hub case are joined to each other by tilting the main body case forward, and then a trailing driving wheel is allowed to float using a leading driving wheel as a supporting point, among two grounded driving wheels and since a moment for tilting the main body case forward is larger than a moment for tilting the main body case rearward using a torque that is output from the second motor and causes the main body case to be tilted rearward in the traveling direction, the hub case rotates and the plurality of driving wheels revolve by a reaction of the torque.

(15) The method of controlling a walking assist device according to (13), wherein when the driving wheels go down a downhill road, the first motor is regeneratively driven such that rotation of the driving wheels is decelerated to match rotation of driving wheels with a walking speed o walker.

(16) The method of controlling a walking assist device according to (13), wherein when the walker tries to stop, the first motor is regeneratively driven such that rotation of the driving wheels is decelerated to stop the rotation of the driving wheels.

(17) The method of controlling a walking assist device according to (13), wherein when the walker goes up stairs, the main body case and the hub case are joined to each other by tilting the main body case forward, and then a trailing driving wheel is allowed to float using a leading driving wheel as a supporting point, among two grounded driving wheels; and since a moment for tilting the main body case forward is larger than a moment for tilting the main body case rearward using a torque that is output from the second motor and causes the main body case to be tilted rearward in the traveling direction, the hub case rotates and the plurality of driving wheels revolve by a reaction of the torque.

(18) The method of controlling a walking assist device according to (13), wherein when the walker tries to go down stairs, a leading driving wheel falls off from a step and only a trailing driving wheel is functioned as a supporting point; and since a moment for tilting the main body case forward is larger than a moment for tilting the main body case rearward using a torque that is output from the second motor and causes the main body case to be tilted rearward in the traveling direction, the hub case rotates and the plurality of driving wheels revolve by a reaction of the torque.

According to (1), the walking assist device includes the plurality of driving wheels that can rotate and revolve according to the driving of the first motor and the second motor. Therefore, the movement in the traveling direction is assisted due to the rotation of the plurality of driving wheels, and the walking assist device can be adapted to various walkways (for example, can climb over a step or can go up and down stairs) due to the revolution of the plurality of driving wheels.

According to (2), the controller controls the first motor such that movement in the traveling direction of the walking assist device is assisted, and controls the second motor such that the center of gravity in the traveling direction of the walking assist device is balanced. Therefore, the movement of the walker can be assisted while reducing a load applied to the walker.

According to (3), the irreversible rotation transmission member including the input shaft, the output shaft, and the outer ring member is provided on the power transmission path from the second motor to the hub case and the main body case; a torque of the input shaft is transmitted to the output shaft; a torque of the output shaft is transmitted to the outer ring member without being transmitted to the input shaft; in a state where the output shaft is fixed, the input shaft does not rotate and rotation of the outer ring member is allowed; the stator of the second motor is connected to the input shaft; the main body case is connected to the output shaft; and the hub case is connected to the outer ring member through the rotor of the second motor. Therefore, a torque of the second motor can be selectively transmitted to the hub case and the main body case according to the circumstances without performing an electrical clutch control.

According to (4), the first motor and the second motor are disposed outside of a revolution circumferential track of the plurality of driving wheels supported by the hub case. Therefore, an increase in size in the width direction of the walking assist device can be suppressed, and the manageability and designability of the walking assist device can be improved.

According to (5), the revolution torque transmission mechanism disposed on one side in the width direction of the walking assist device, the balance torque transmission mechanism is disposed on another side in the width direction of the walking assist device, and the plurality of driving wheels and the rotation torque transmission mechanism are disposed between the revolution torque transmission mechanism and the balance torque transmission mechanism. Therefore, the plurality of driving wheels can be disposed in the vicinity of the center in the width direction of the walking assist device, and the balance in the width direction of the walking assist device can be improved.

According to (6), one of the upstream side rotation torque transmission mechanism and the downstream side rotation torque transmission mechanism is disposed between the revolution torque transmission mechanism and the plurality of driving wheels, and another one of the upstream side rotation torque transmission mechanism and the downstream side rotation torque transmission mechanism is disposed between the balance torque transmission mechanism and the plurality of driving wheels. Therefore, the balance in the width direction of the walking assist device can further be improved.

According to (7), the walking assist device includes the braking mechanism for stopping the rotation of the plurality of driving wheels. Therefore, the movement of the walking assist device can be reliably stopped.

According to (8), the main body case includes the hook portion for hanging the luggage. Therefore, in a state where the luggage is hung, the movement of the walker can be assisted, and the center of gravity in the traveling direction of the walking assist device can be balanced. As a result, a load of the luggage on the walker can be reduced.

According to (9), the sensor device or the input device for obtaining the intention information regarding the movement of the walker is provided in the holding portion. Therefore, the walker can transmit the intention regarding the movement to the walking assist device through the sensor device or the input device of the holding portion.

According to (10), in the revolution circumferential track of the plurality of driving wheels supported by the hub case, the first motor and the second motor are disposed between one end portion and another end portion in the traveling direction of the walking assist device. Therefore, an increase in size in the traveling direction of the walking assist device can be suppressed.

According to (11), the first motor, the second motor, the revolution torque transmission mechanism, the balance torque transmission mechanism, the holding portion, the battery, the hub case, and the plurality of driving wheels can be compactly disposed with a good balance.

According to (12), in the walking assist device which includes the plurality of driving wheels that can rotate and revolve according to the driving of the first motor and the second motor, and which can be adapted to various walkways due to the revolution of the plurality of driving wheels, the walking assist device can be moved in the traveling direction according to the intention information regarding the movement of the walker.

According to (13), the second motor is controlled such that the center of gravity in the traveling direction of the walking assist device is balanced. Therefore, the movement of the walker can be assisted while reducing a load applied to the walker.

According to (14), when the driving wheels come into contact with a step that is difficult to climb over, the main body case is tilted forward to enter into a state where the main body case and the hub case are joined to each other, and a state where a trailing driving wheel is floated using a leading driving wheel as a supporting point, among two grounded driving wheels, is allowed. A moment for tilting the main body case forward is set to be larger than a moment for tilting the main body case rearward using a torque that is output from the second motor and causes the main body case to be tilted rearward in the traveling direction. As a result, the hub case rotates and the plurality of driving wheels revolve by a reaction of the torque. Therefore, the walking assist device can climb over the step.

According to (15), when the driving wheels go down a downhill road, the first motor is regeneratively driven such that the rotation of the driving wheels is decelerated and the rotation of the driving wheels is matched with a walking speed of the walker. The acceleration of the walking assist device in the downhill road can be suppressed, and a weight load of the walker applied forward can also be received.

According to (16), when the walker tries to stop, the first motor is regeneratively driven such that rotation of the driving wheels is decelerated and the rotation of the driving wheels is stopped. Therefore, the walking assist device can be smoothly stopped according to a walking speed of the walker.

According to (17), when the walker go up stairs, the main body case is tilted forward to enter into a state Where the main body case and the hub case are joined to each other, and a state where a trailing driving wheel is floated using a leading driving wheel as a supporting point, among two grounded driving wheels, is allowed. A moment for tilting the main body case forward is set to be larger than a moment for tilting the main body case rearward using a torque that is output from the second motor and causes the main body case to be tilted rearward in the traveling direction. As a result, the hub case rotates and the plurality of driving wheels revolve by a reaction of the torque. Therefore, the walking assist device can go up the stairs.

According to (18), when the walker tries to go down stairs, a leading driving wheel falls off from a step, and only a trailing driving wheel functions as a supporting point. A moment for tilting the main body case forward is set to be larger than a moment for tilting the main body case rearward using a torque that is output from the second motor and causes the main body case to be tilted rearward in the traveling direction. As a result, the hub case rotates and the plurality of driving wheels revolve by a reaction of the torque. Therefore, the walking assist device can go down the stairs.

DETAILED DESCRIPTION

Figure 1:
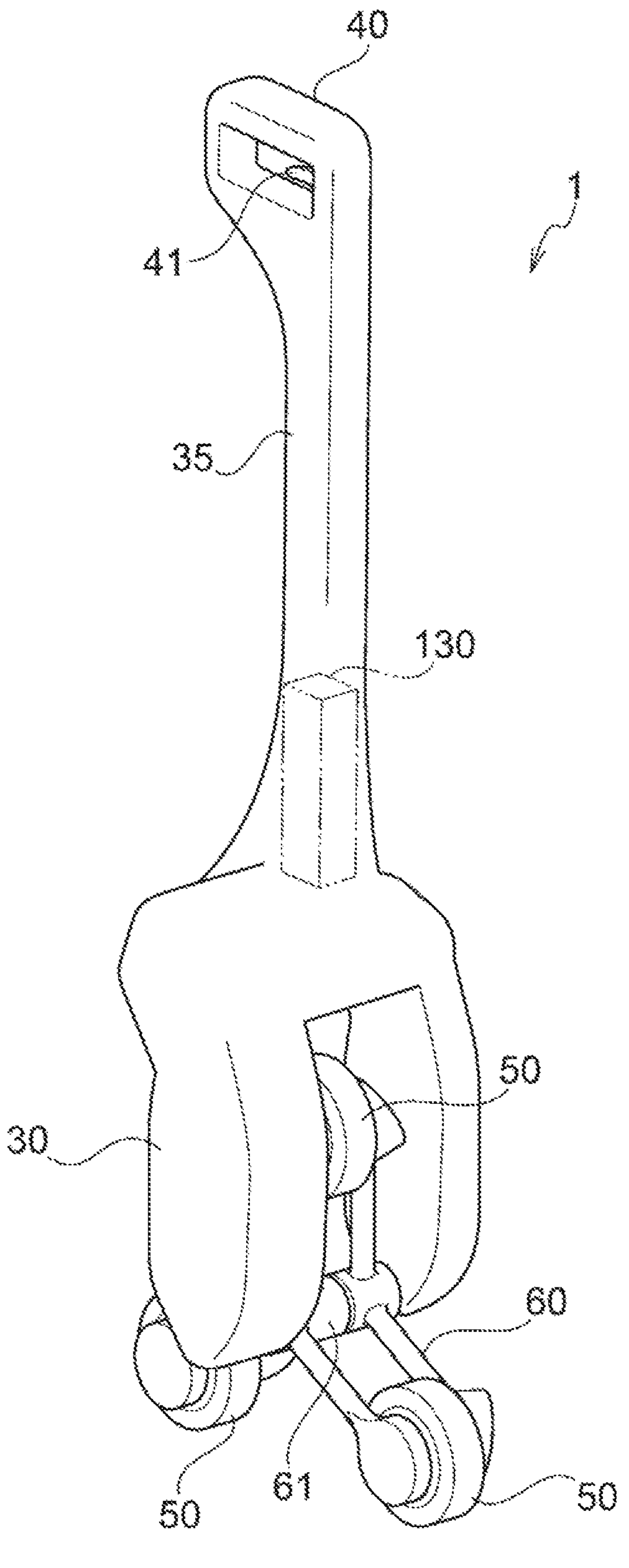
FIG. 1 is a perspective view illustrating a walking assist device according to an embodiment of the present invention.

Hereinafter, an embodiment of a configuration of a walking assist device 1 according to the present invention and a method of controlling the same will be described with reference to the accompanying drawings. The drawings should be seen in a direction of reference numerals. In addition, appropriately, a traveling direction of the walking assist device 1 will be referred to as a front-rear direction, and a width direction of the walking assist device 1 will be referred to as a right-left direction.

[Walking Assist Device]

As illustrated in FIGS. 1 to 4, the walking assist device according to the embodiment of the present invention includes: a first motor 10; a second motor 20; a main body case 30 that accommodates the first motor 10 and the second motor 20; a holding portion 40 that is provided in the main body case 30 and is held by a walker; a plurality of driving wheels 50 that are rotatable around a plurality of rotating shafts 51 provided on the same circumference; a hub case 60 that rotatably supports the plurality of rotating shafts 51 (driving wheels 50) and is supported by the main body case 30 to be rotatable around a center of the plurality of rotating shafts 51 as a pivot 61; a rotation torque transmission mechanism 70 that transmits a torque from the first motor 10 to the plurality of driving Wheels 50; a braking mechanism 80 that is provided on a torque transmission path between the first motor 10 and the plurality of driving wheels 50; a revolution torque transmission mechanism 90 that transmits a torque from the second motor 20 to the hub case 60; a balance torque transmission mechanism 100 that transmits a torque from the second motor 20 to the main body case 30; an irreversible rotation transmission member 110 that is provided on a torque transmission path from the second motor 20 to the hub case 60 and the main body case 30; a controller 120 (refer to FIG. 7) that controls the first motor 10, the second motor 20, and the braking mechanism 80 according to intention information regarding movement of the walker; and a battery 130 that is electrically connected to the first motor 10, the second motor 20, and the like.

(First Motor)

The first motor 10 includes: a stator 12 that is fixed to an inner peripheral portion of a motor cover 11; a rotor 13 that is rotatably disposed on an inner peripheral side of the stator 12; and a rotor shaft 14 that is joined to an inner peripheral portion of the rotor 13 and is rotatably supported by the motor cover 11. The motor cover 11 is fixed to the main body case 30, and a torque output from the rotor shaft 14 is transmitted to the plurality of driving wheels 50 through the rotation torque transmission mechanism 70.

(Second Motor)

The second motor 20 includes: a stator 22 that is fixed to an inner peripheral portion of a motor cover 21; a rotor 23 that is rotatably disposed on an inner peripheral side of the stator and a rotor shaft 24 that is joined to an inner peripheral portion of the rotor 23 and is rotatably supported by the motor cover 21. The second motor 20 is connected to the revolution torque transmission mechanism 90 and the balance torque transmission mechanism 100 through the irreversible rotation transmission member 110, and a torque output from the rotor shaft 24 or the motor cover 21 is transmitted to the hub case 60 or the main body case 30.

(Main Body Case)

The main body case 30 includes: a motor accommodation portion 31 that accommodates the first motor 10 and the second motor 20; a revolution torque transmission mechanism accommodation portion 32 that is connected to one side of the motor accommodation portion 31 in the right-left direction and accommodates the revolution torque transmission mechanism 90; a rotation torque transmission mechanism accommodation portion 33 that is connected to another side of the motor accommodation portion 31 in the right-left direction and accommodates the rotation torque transmission mechanism 70 and the braking mechanism 80; a balance torque transmission mechanism accommodation portion 34 that is connected to the outside of the rotation torque transmission mechanism accommodation portion 33 and accommodates the balance torque transmission mechanism 100; and a cylindrical portion 35 that connects the holding portion 40 and an upper portion of the motor accommodation portion 31 to each other and accommodates the battery 130.

The main body case 30 has a space S for disposing the hub case 60 and the plurality of driving wheels 50, and this space S is provided below the motor accommodation portion 31 to be interposed between the revolution torque transmission mechanism accommodation portion 32, and the rotation torque transmission mechanism accommodation portion 33 and the balance torque transmission mechanism accommodation portion 34 in the right-left direction. The pivot 61 of the hub case 60 is rotatably supported between a lower end inner surface of the revolution torque transmission mechanism accommodation portion 32 and a lower end inner surface of the rotation torque transmission mechanism accommodation portion 33.

Figure 2A:
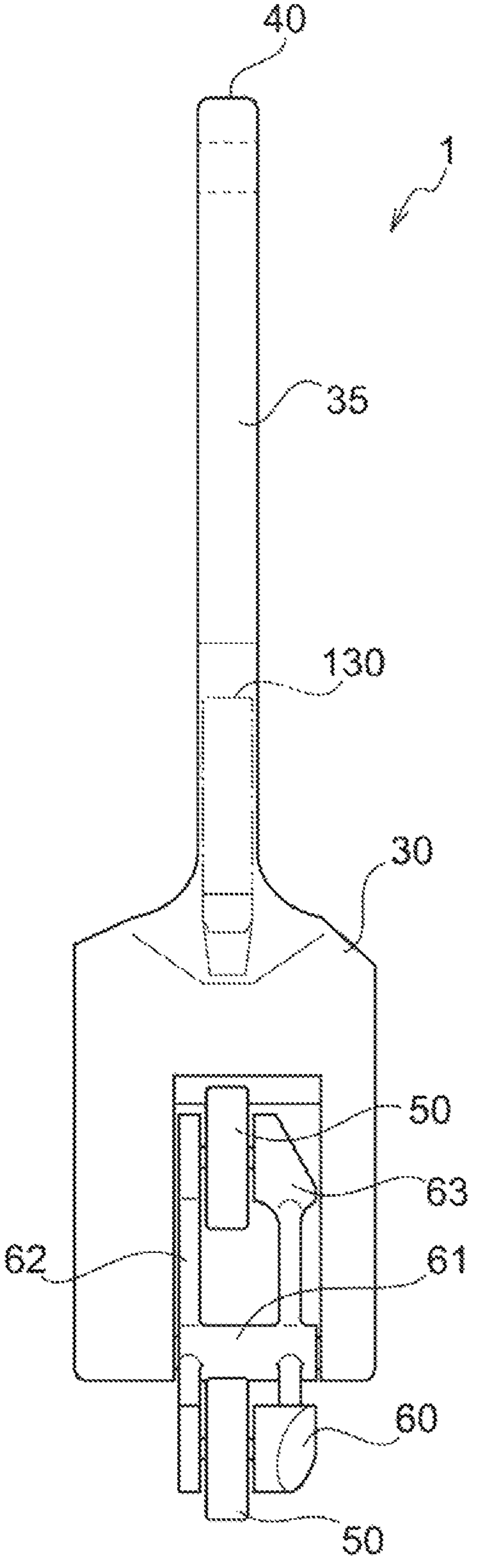
FIG. 2A is a front view illustrating the walking assist device according to the embodiment of the present invention.
Figure 2B:
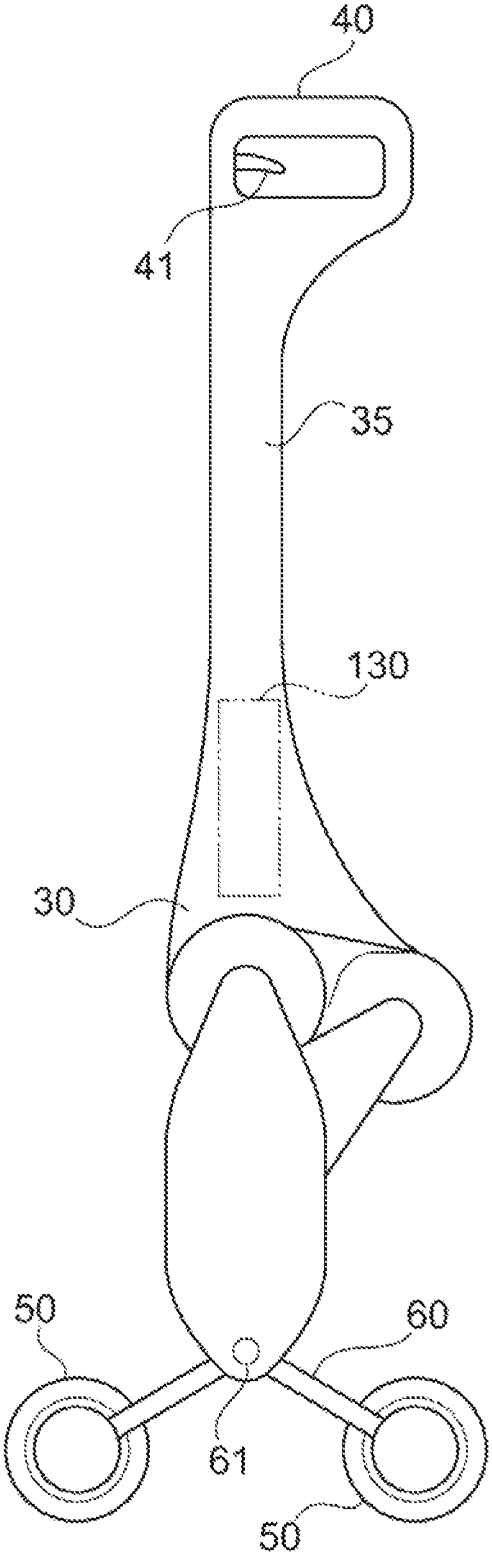
FIG. 2B is a side view illustrating the walking assist device according to the embodiment of the present invention.

Although not illustrated in FIGS. 1, 2A, and 2B, a hook portion 36 (refer to FIGS. 11 to 15) for hanging luggage B such as a handbag is provided in the main body case 30. The hook portion 36 according to the embodiment is operated to protrude or to be stored in a hanging state where the hook portion 36 protrudes from an upper end portion (near a lower portion of the holding portion 40) of the cylindrical portion 35 to any one of the right and left sides and a stored state where the hook portion 36 is stored in the upper end portion of the cylindrical portion 35.

In addition, a stand 37 (refer to FIG. 11) for self-standing the walking assist device 1 in a standstill state is provided on lower end right and left outer surfaces of the main body case 30. The stand 37 is operated to be open and closed in an open state where the stand 37 extends obliquely from the lower end right and left outer surfaces of the main body case 30 and tip portions are grounded to restrict the walking assist device 1 from falling down in the right-left direction and a closed state where the stand 37 is stored along the lower end right and left outer surfaces of the main body case 30. In addition, the stand 37 according to the embodiment functions as a tool for operating a power supply of the walking assist device 1. In a case where the stand 37 is in the closed state, a power switch 121 (refer to FIG. 7) is switched on. In a case where the stand 37 is in the open state, the power switch 121 is switched off.

(Holding Portion)

A sensor device or an input device for obtaining the intention information regarding the movement of the walker is provided in the holding portion 40. As the sensor device, a main body tilting detection sensor 122 (refer to FIG. 7: for example. a 3-axis acceleration sensor) that detects forward/rearward tilting of the main body case 30 is provided. Based on a forward tilting operation of the main body case 30 in the holding portion 40, intention information that the walker tries to move (move forward) is obtained. Based on a rearward tilting operation of the main body case 30 in the holding portion 40, intention information that the walker tries to stop is obtained. In addition, as the input device, an operation lever 41 that is operated by fingers holding the holding portion 40 is provided. Based on the operation of the operation lever 41, intention information that the walker tries to return the walking assist device 1 to the standstill state is obtained. The sensor device or the input device for obtaining the intention information regarding the movement of the walker is not limited to the above-described examples. For example, a pressure sensor, an operation button, an acceleration handle, or a voice recognition device may be provided.

(Driving Wheels)

Figure 4:
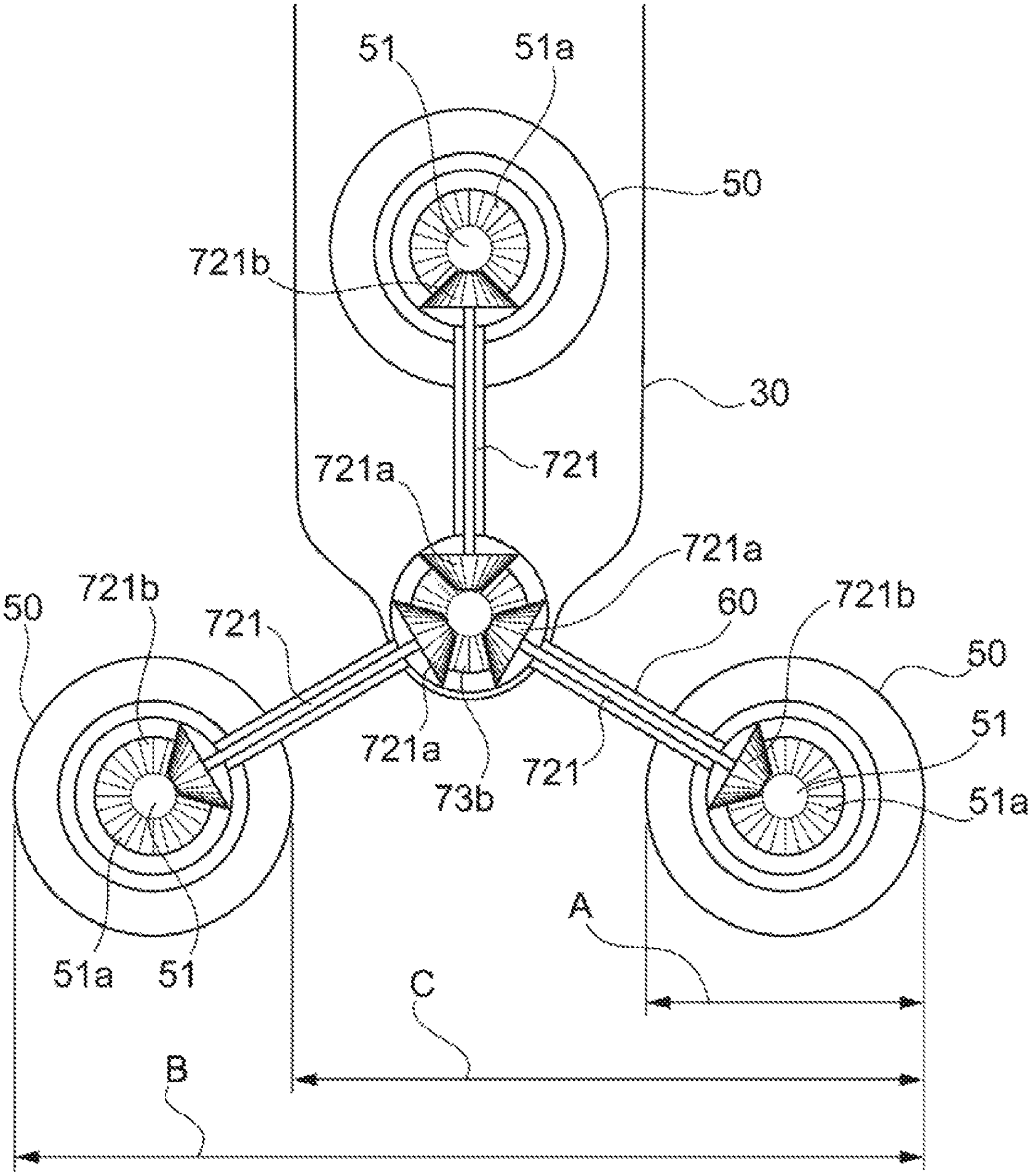
FIG. 4 is a schematic side view illustrating the inside of driving wheels and a hub case in the walking assist device according to the embodiment of the present invention.

The walking assist device 1 according to the embodiment includes three driving wheels 50 provided on the same circumference. In a typical traveling state other than a state where the walking assist device 1 climbs over a step and a state where the walking assist device 1 goes up stairs, the walking assist device 1 moves in the traveling direction by rotation of two grounded driving wheels 50 among the three driving wheels 50. As illustrated in FIG. 4, the driving wheels 50 according to the embodiment have a diameter A at which the walking assist device 1 can climb over a small step only by the rotation of the driving wheels 50. In addition, a distance B from a front end in the traveling direction to a rear end in the traveling direction of the two grounded driving wheels 50 is set to a value at which the walking assist device 1 can enter an elevator. Further, a distance C between front end portions of adjacent driving wheels 50 is set to be a value at which the walking assist device 1 can go up stairs by revolution of the driving wheels 50. However, the dimension or number of the driving wheels 50 can be arbitrarily modified according to the use or a usage environment of the walking assist device 1.

(Hub Case)

The hub case 60 includes: the pivot 61 having a hollow cylindrical shape that is the rotation center of the hub case 60; three first driving wheel support cases 62, each of which extends from one side of the pivot 61 in the right-left direction toward an outer diameter direction; and three second driving wheel support cases 63, each of which extends from another side of the pivot 61 in the right-left direction toward the outer diameter direction so as to be in the same phase as that of the first driving wheel support case 62 in a rotating direction. The rotating shafts 51 of the driving wheels 50 are rotatably supported between tip portions of the first driving wheel support cases 62, and the second driving wheel support case 63. In addition, the pivot 61 and the second driving wheel support cases 63 function as a transmission case that accommodates a part of the rotation torque transmission mechanism 70.

(Rotation Torque Transmission Mechanism)

The rotation torque transmission mechanism 70 includes: an upstream side rotation torque transmission mechanism 71 that is accommodated in the rotation torque transmission mechanism accommodation portion 33 of the main body case 30; a downstream side rotation torque transmission mechanism 72 that is accommodated in the second driving wheel support cases 63 of the hub case 60; and a through shaft 73 that passes through the pivot 61 of the hub case 60 and connects the upstream side rotation torque transmission mechanism 71 and the downstream side rotation torque transmission mechanism 72 to each other to be capable of transmitting a torque.

The upstream side rotation torque transmission mechanism 71 includes: a first transmission shaft 711 that is connected to the rotor shaft 14 of the first motor and a second transmission shaft 712 that is rotatably supported on a lower end side of the rotation torque transmission mechanism accommodation portion 33. A small-diameter pulley 711*a* is provided in the first transmission shaft 711. A large-diameter pulley 712*a* and a small-diameter gear 712*h* are provided in the second transmission shaft 712. In a case where a torque is output from the rotor shaft 14 of the first motor 10 to the first transmission shaft 711, the torque is transmitted from the small-diameter pulley 711*a* of the first transmission shaft 711 to the large-diameter pulley 712*a* of the second transmission shaft 712 through a transmission belt 713, and the torque is transmitted from the small-diameter gear 712*b* of the second transmission shaft 712 to a small-diameter gear 73*a* provided in one end portion of the through shaft 73.

The downstream side rotation torque transmission mechanism 72 includes three transmission shafts 721, each of which extends from another end portion of the through shaft 73 toward the outer diameter direction. In opposite end portions of each of the transmission shafts 721, bevel gears 721*a* and 721*b* are provided. A torque that is transmitted from the first motor 10 to the one end portion of the through shaft 73 through the upstream side rotation torque transmission mechanism 71 is transmitted from a bevel gear 73*b* provided in the other end portion of the through shaft 73 to the bevel gear 721*a* of each of the transmission shafts 721, and the torque is transmitted from the bevel gear 721*b* to a bevel gear 51*a* provided in the rotating shaft 51 of each of the driving wheels 50.

(Braking Mechanism)

The braking mechanism 80 includes: a disk portion 81 that is provided in the first transmission shaft 711 of the upstream side rotation torque transmission mechanism 71; and a braking portion 82 that generates a braking force by interposing an outer peripheral side of the disk portion 81 between opposite right and left sides. The braking portion 82 includes an actuator that electrically operates, and the controller 120 operates the braking mechanism 80 based on a driving control of the actuator. The braking mechanism 80 may be a manual braking mechanism that is mechanically and manually operated without interposing the controller 120.

(Revolution Torque Transmission Mechanism)

The revolution torque transmission mechanism 90 includes four transmission shafts 91 to 94 that are rotatably supported by the revolution torque transmission mechanism accommodation portion 32 of the main body case 30, and the first transmission shaft 91 is connected to the rotor shaft 24 of the second motor 20. In the first transmission shaft 91, a small-diameter pulley 91*a* is provided. In the second transmission shaft 92, a large-diameter pulley 92*a* and a small-diameter pulley 92*b* are provided. In the third transmission shaft 93, a large-diameter pulley 93*a* and a small-diameter gear 93*h* are provided. In the fourth transmission shaft 94, a large-diameter gear 94*a* and a small-diameter gear 94*b* are provided. In a case where a torque is output from the rotor shaft 24 of the second motor 20 to the first transmission shaft 91, the torque is transmitted from the small-diameter pulley 91*a* of the first transmission shaft 91 to the large-diameter pulley 92*a* of the second transmission shaft 92 through a first transmission belt 95, and the torque is transmitted from the small-diameter pulley 92*h* of the second transmission shaft 92 to the large-diameter pulley 93*a* of the third transmission shaft 93 through a second transmission belt 96. Concurrently, the torque is transmitted from the small-diameter gear 93*b* of the third transmission shaft 93 to the large-diameter gear 94*a* of the fourth transmission shaft 94, and the torque is transmitted from the small-diameter gear 94*b* of the fourth transmission shaft 94 to a small-diameter gear 61*a* provided in one end portion of the pivot 61 of the hub case 60.

(Balance Torque Transmission Mechanism)

The balance torque transmission mechanism 100 includes four transmission shafts 101 to 104 that are rotatably supported by the balance torque transmission mechanism accommodation portion 34 of the main body case 30, and the first transmission shaft 101 is connected to the motor cover 21 of the second motor 20 through the irreversible rotation transmission member 110. In the first transmission shaft 101, a small-diameter pulley 101*a* is provided. In the second transmission shaft 102, a large-diameter pulley 102*a* and a small-diameter pulley 102*b* are provided. In the third transmission shaft 103, a large-diameter pulley 103*a* and a small-diameter gear 103*h* are provided. In the fourth transmission shaft 104, a large-diameter gear 104*a* and a small-diameter gear 104*h* are provided. In a case where a torque is transmitted from the motor cover 21 of the second motor 20 to the first transmission shaft 101 through the irreversible rotation transmission member 110, the torque is transmitted from the small-diameter pulley 101*a* of the first transmission shaft 101 to the large-diameter pulley 102*a* of the second transmission shaft 102 through a first transmission belt 105, and the torque is transmitted from the small-diameter pulley 102*b* of the second transmission shaft 102 to the large-diameter pulley 103*a* of the third transmission shaft 103 through a second transmission belt 106. Concurrently, the torque is transmitted from the small-diameter gear 103*b* of the third transmission shaft 103 to the large-diameter gear 104*a* of the fourth transmission shaft 104, and the torque is transmitted from the small-diameter gear 104*b* of the fourth transmission shaft 104 to a small-diameter gear 30*a* provided in the main body case 30. The small-diameter gear 30*a* is disposed on the same axial center as those of the pivot 61 and the small-diameter gear 61*a* of the hub case 60. In a case where a torque is input to the small-diameter gear 30*a,* the main body case 30 is tilted forward and rearward by a reaction of the torque.

(Irreversible Rotation Transmission Member)

Figure 3:
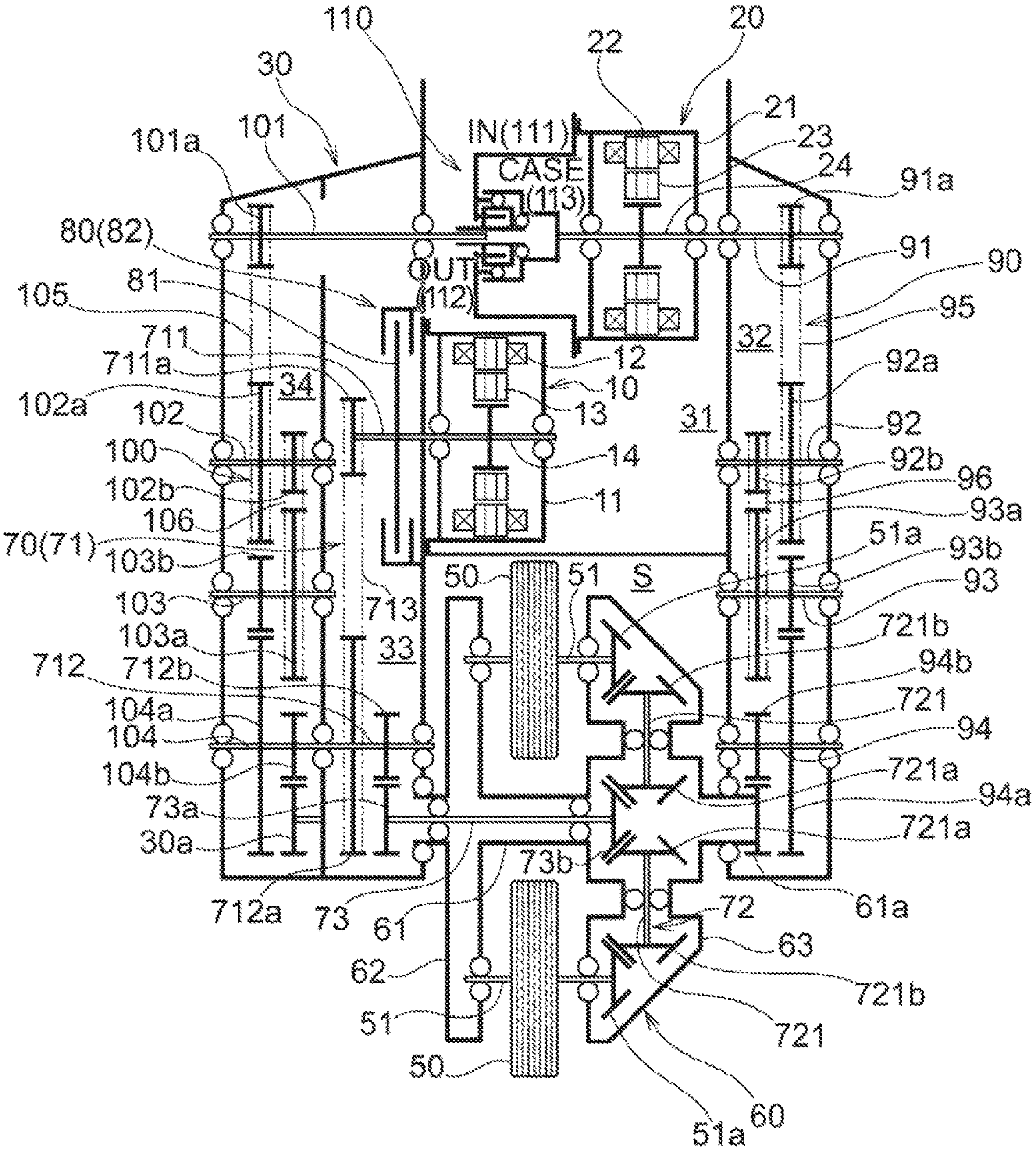
FIG. 3 is a skeleton diagram illustrating a torque transmission mechanism of the walking assist device according to the embodiment of the present invention and a disposition thereof.
Figure 5A:
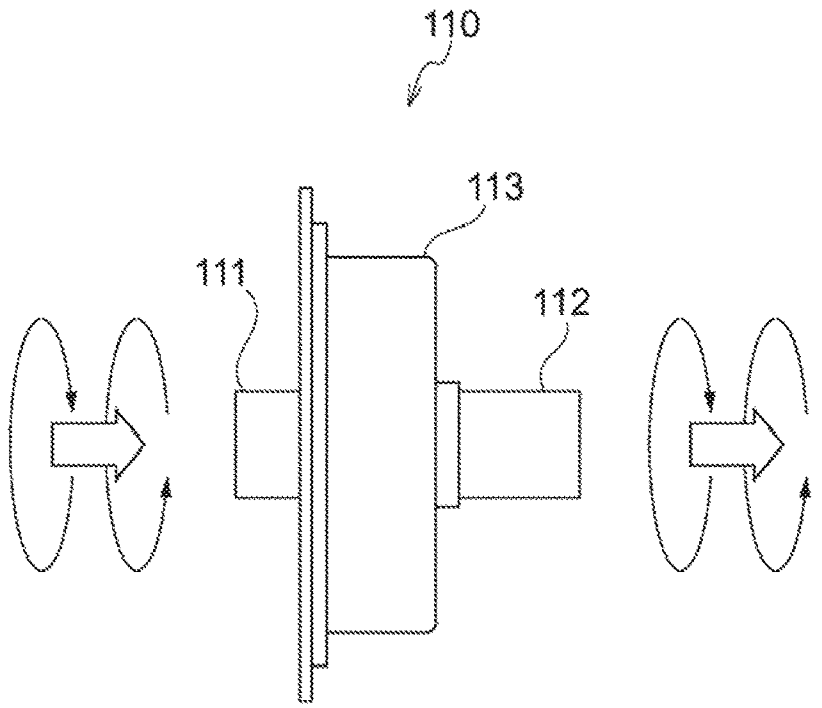
FIG. 5A is a diagram illustrating an irreversible rotation transmission member in a state a torque is input from an input shaft side in the irreversible rotation transmission member of the walking assist device according to the embodiment of the present invention.
Figure 5B:
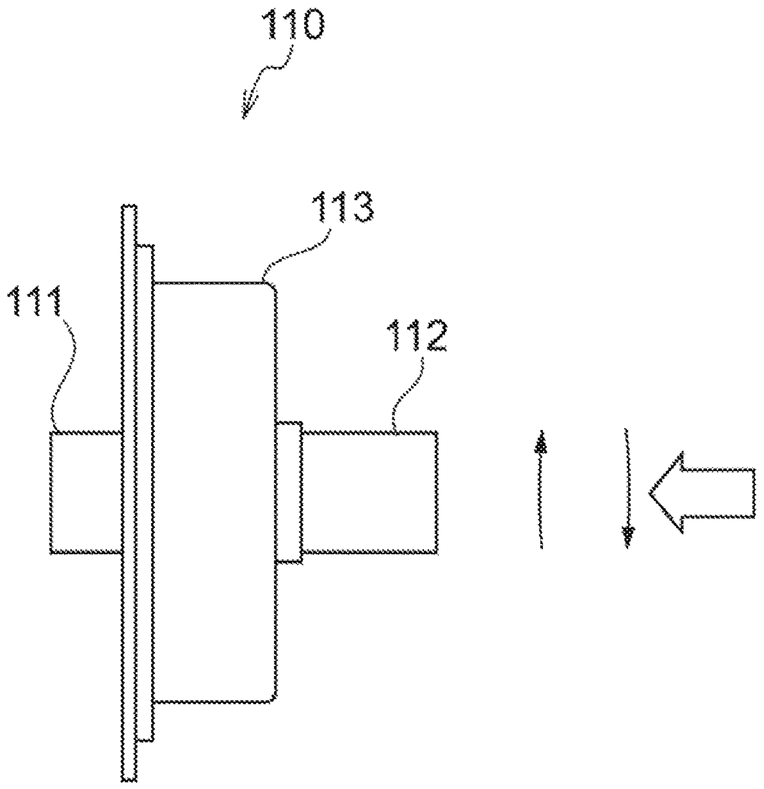
FIG. 5B is a diagram illustrating an irreversible rotation transmission member in a state a torque is input from an output shaft side in the irreversible rotation transmission member of the walking assist device according to the embodiment of the present invention.

As illustrated in FIGS. 3, 5A, and 5B, the irreversible rotation transmission member 110 is a mechanical element including an input shaft 111, an output shaft 112, and an outer ring member 113 and having the following characteristics: a torque of the input shaft 111 is transmitted to the output shaft 112; a torque of the output shaft 112 is transmitted to the outer ring member 113 without being transmitted to the input shaft 111; and in a state where the output shaft 112 is fixed, the input shaft 111 does not rotate and rotation of the outer ring member 113 is allowed. For example, a lock type torque diode (registered trade name; manufactured by NTN Corporation) can be used. FIGS. 5A and 5B are schematic diagrams illustrating an operation of the irreversible rotation transmission member 110 having a different shape from that in FIG. 3.

The motor cover 21 (stator 22) of the second motor 20 is connected to the input shaft 111 of the irreversible rotation transmission member 110, the main body case 30 is connected to the output shaft 112 through the balance torque transmission mechanism 100, and the hub case 60 is connected to the outer ring member 113 through the rotor shaft 24 (rotor 23) of the second motor 20 and the revolution torque transmission mechanism 90.

Figure 6A:
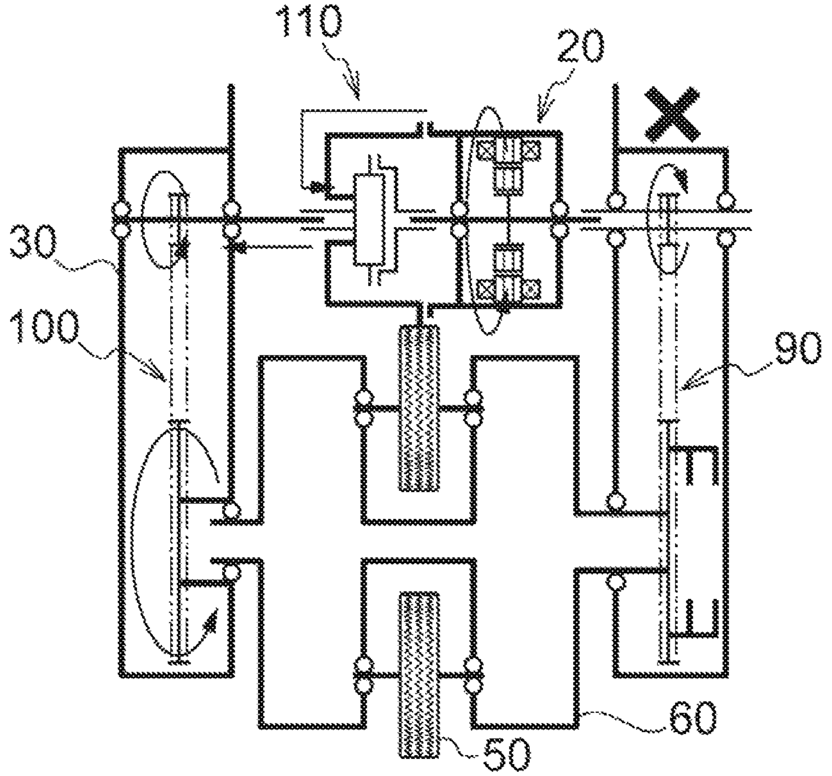
FIG. 6A is a diagram illustrating a behavior of the irreversible rotation transmission member in the walking assist device according to the embodiment of the present invention during normal walking.

According to the irreversible rotation transmission member 110, as illustrated in FIG. 6A, during normal walking during which two driving wheels 50 are grounded and the hub case 60 does not rotate, the second motor 20, the rotor shaft 24 (rotor 23), and the outer ring member 113 of the irreversible rotation transmission member 110 are stopped, and a torque of the second motor 20 is output from the motor cover 21 (stator 22) and is input to the input shaft 111 of the irreversible rotation transmission member 110. Therefore, the torque is transmitted from the output shaft 112 of the irreversible rotation transmission member 110 to the main body case 30 through the balance torque transmission mechanism 100, and the main body case 30 is tilted forward and rearward by a reaction of the torque.

Figure 6B:
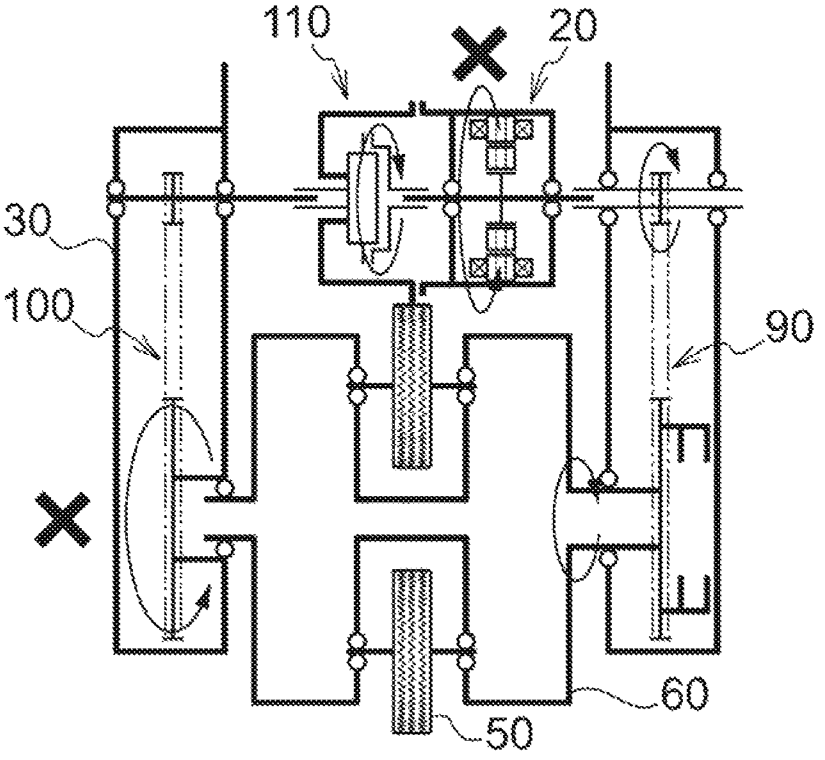
FIG. 6B is a diagram illustrating a behavior of the irreversible rotation transmission member when the walking assist device according to the embodiment of the present invention climbs over a step or goes up stairs.

In addition, as illustrated in FIG. 6B, when the forward/rearward tilting of the main body case 30 is restricted and the walking assist device 1 climbs over a step or goes up stairs, the output shaft 112 of the irreversible rotation transmission member 110 is stopped, and the rotation of the input shaft 111 of the irreversible rotation transmission member 110 and the motor cover 21 (stator 22) of the second motor 20 is locked. Therefore, a torque of the second motor 20 is output from the rotor shaft 24 (rotor connected to the outer ring member 113 where rotation is allowed. The torque is transmitted to the hub case 60 through the revolution torque transmission mechanism 90 such that the hub case 60 rotates and the driving wheels 50 revolve.

Figure 6C:
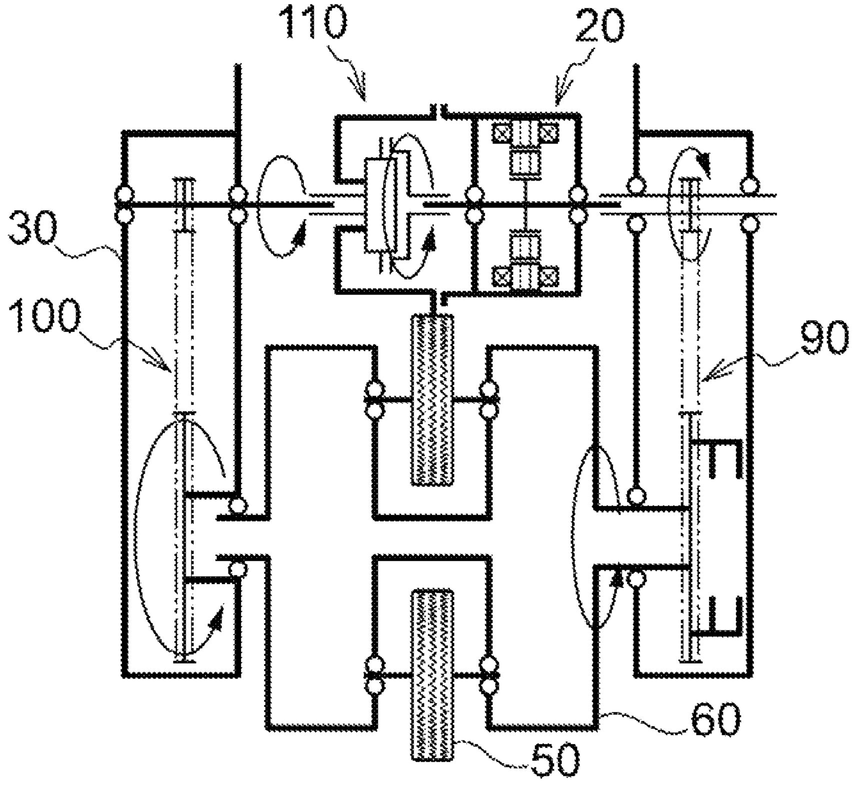
FIG. 6C is a diagram illustrating a behavior of the irreversible rotation transmission member when the walking assist device according to the embodiment of the present invention falls forward.

In addition, as illustrated in FIG. 6C, when a moment in the front-rear direction is input to the main body case 30 and the walking assist device 1 falls forward toward a step, a torque is input to the output shaft 112 of the irreversible rotation transmission member 111 through the balance torque transmission mechanism 100. However, this torque is transmitted to the outer ring member 113 without being transmitted to the input shaft 111 of the irreversible rotation transmission member 110. As a result, the main body case 30 and the hub case 60 are joined to each other, and a state where a trailing driving wheel 50 is floated using a leading driving wheel 50 as a supporting point, among two grounded driving wheels, is allowed.

(Controller)

The controller 120 controls the first motor 10 such that movement in the traveling direction of the walking assist device 1 is assisted, and controls the second motor 20 such that the center of gravity in the traveling direction of the walking assist device 1 is balanced. The details of a method of controlling the first motor 10 and the second motor 20 using the controller 120 will be described.

[Disposition Configuration of Walking Assist Device]

Next, a disposition configuration of each of the components in the walking assist device 1 will be described with reference to FIGS. 1 to 3.

The first motor 10 and the second motor 20 are disposed outside of a revolution circumferential track of the plurality of driving wheels 50 supported by the hub case 60. In the revolution circumferential track, the first motor 10 and the second motor 20 are disposed between one end portion and another end portion in the traveling direction of the walking assist device 1.

In addition, when seen from the traveling direction of the walking assist device 1, the revolution torque transmission mechanism 90 is disposed on one side in the width direction of the walking assist device 1, the balance torque transmission mechanism 100 is disposed on another side in the width direction of the walking assist device 1, and the plurality of driving wheels 50 and the rotation torque transmission mechanism 70 are disposed between the revolution torque transmission mechanism 90 and the balance torque transmission mechanism 100.

Further, when seen from the traveling direction of the walking assist device 1, the plurality of driving wheels 50 are provided substantially at a center in the width direction of the walking assist device 1, one of the upstream side rotation torque transmission mechanism 71 and the downstream side rotation torque transmission mechanism 72 is disposed between the revolution torque transmission mechanism 90 and the plurality of driving wheels 50, and another one of the upstream side rotation torque transmission mechanism 71 and the downstream side rotation torque transmission mechanism 72 is disposed between the balance torque transmission mechanism 100 and the plurality of driving wheels 50.

[Method of Controlling Walking Assist Device]

Next, the method of controlling the walking assist device 1 will be described with reference to FIGS. 7 to 10.

Figure 7:
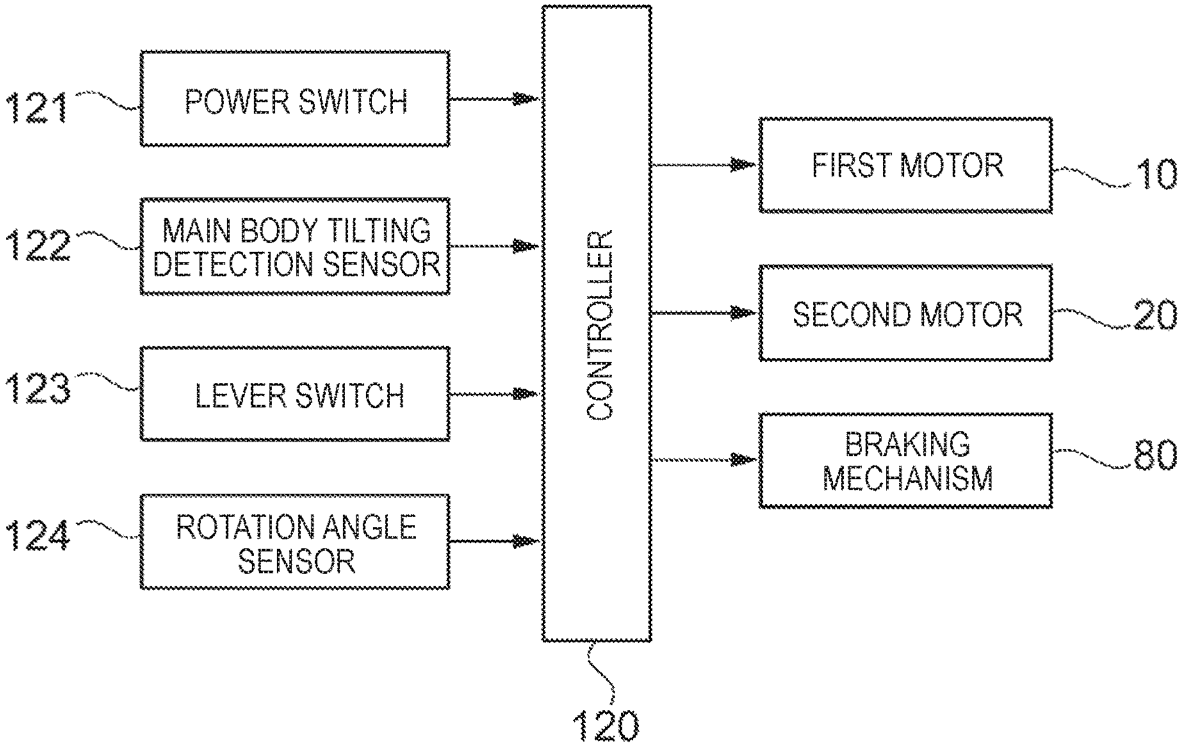
FIG. 7 is a block diagram illustrating a control configuration of the walking assist device according to the embodiment of the present invention.

As illustrated in FIG. 7, the power switch 121, the main body tilting detection sensor 122. a lever switch 123, and a rotation angle sensor 124 are connected to the input side of the controller 120, the power switch 121 is switched on according to the operation of opening the stand 37, the main body tilting detection sensor 122 detects forward/rearward tilting of the main body case 30, the lever switch 123 is switched on according to the operation of the operation lever 41, and the rotation angle sensor 124 detects a rotation angle of the hub case 60 relative to the main body case 30 in order to detect a downhill road or the like. The first motor 10, the second motor 20, and the braking mechanism 80 are connected to the output side of the controller 120.

Figure 8:
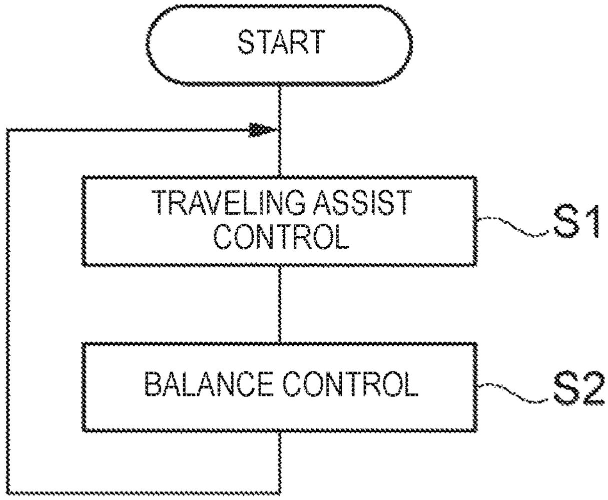
FIG. 8 is a flowchart illustrating a method (main routine) of controlling the walking assist device according to the embodiment of the present invention.

As illustrated in FIG. 8, once the power switch 121 is switched on, the controller 120 is activated and repeatedly performs a traveling assist control (S1) and a balance control (S2). Only one of the traveling assist control (S1) and the balance control (S2) may be performed, or both the traveling assist control (S1) and the balance control (S2) may be simultaneously performed. The traveling assist control is a control of controlling the first motor 10 and the braking mechanism 80 according to intention information regarding movement of the walker such that movement in the traveling direction of the walking assist device 1 is assisted. The balance control is a control of controlling the second motor 20 such that the center of gravity in the traveling direction of the walking assist device 1 is balanced. Hereinafter, a specific control procedure of the traveling assist control and the balance control will be described with reference to FIGS. 9 and 10.

Figure 9:
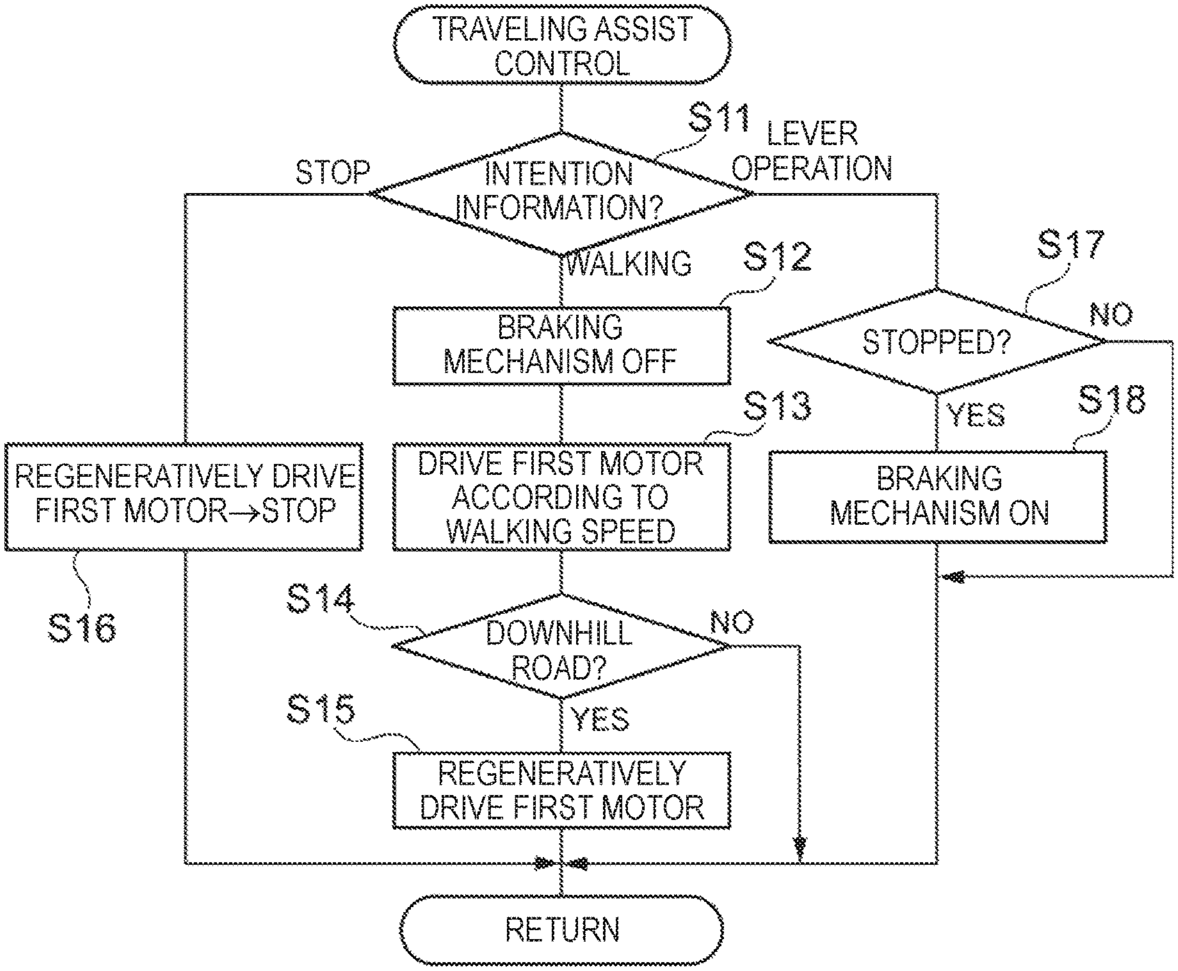
FIG. 9 is a flowchart illustrating the method (traveling assist control) of controlling the walking assist device according to the embodiment of the present invention.

As illustrated in FIG. 9, in the traveling assist control, the controller 120 first obtains the intention information regarding the movement of the walker (S11). In the traveling assist control according to the embodiment, the controller 120 obtains "walking," "stop," or "lever operation" as the intention information regarding the movement of the walker. "Walking" is intention information that the walker tries to move the walking assist device 1 forward in the traveling direction. In the embodiment, the controller 120 obtains "walking" based on an operation of pushing the holding portion 40 forward (in the embodiment, determined based on a change in detection angle of the main body tilting detection sensor 122). "Stop" is intention information that the walker tries to stop the movement of the walking assist device 1. In the embodiment, the controller 120 obtains "stop" based on an operation of pulling the holding portion 40 rearward (in the embodiment, determined based on a change in detection angle of the main body tilting detection sensor 122). "Lever operation" is intention information that the walker tries to set the walking assist device 1 to enter the standstill state. The controller 120 obtains "lever operation" based on an operation of the operation lever 41 (in the embodiment, determined based on the switch-on of the lever switch 123).

In a case where the controller 120 obtains "walking" as the intention information, the controller 120 causes the braking mechanism 80 to be turned off (brake releasing) (S12), and controls the first motor 10 such that rotation of the driving wheels 50 matches a walking speed of the walker (S13). In addition, in a case where the controller 120 obtains "walking" as the intention information, the controller 120 determines whether or not the walking assist device 1 is positioned on a downhill road (S14: in the embodiment, determined based on a detection angle of the rotation angle sensor 124). In a case where the determination result is "YES", the controller 120 causes the first motor 10 to he regeneratively driven such that rotation of the driving wheels 50 is decelerated (S15).

In a case where the controller 120 obtains "stop" as the intention information, the controller 120 causes the first motor 10 to be regeneratively driven such that rotation of the driving wheels 50 is decelerated, and thus the rotation of the driving wheels 50 is stopped (S16).

In addition, in a case where the controller 120 obtains "lever operation" as the intention information, the controller 120 determines whether or not the first motor 10 (driving wheels 50) is stopped (S17). In a case where the determination result is "YES", the controller 120 causes the braking mechanism 80 to be turned on (braking) (S18). The operation and effects of the traveling assist control will be described below.

Figure 10:
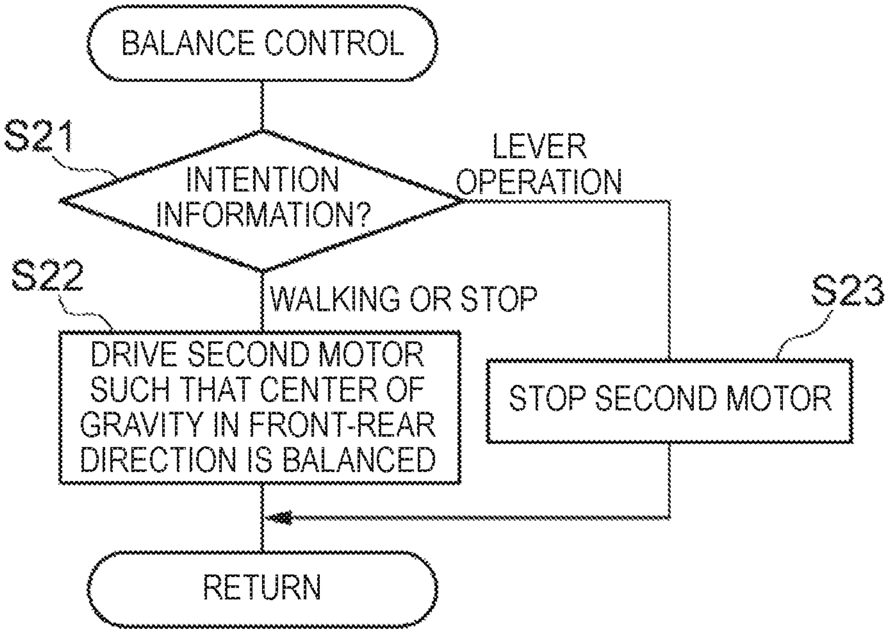
FIG. 10 is a flowchart illustrating the method (balance control) of controlling the walking assist device according to the embodiment of the present invention.

As illustrated in FIG. 10, in the balance control, the controller 120 first obtains the intention information regarding the movement of the walker (S21). In a case where the controller 120 obtains "walking" or "stop" as the intention information, the controller 120 controls the second motor 20 such that the center of gravity in the traveling direction of the walking assist device 1 is balanced (S22). In addition, in a case where the controller 120 obtains "lever operation" as the intention information, the controller 120 causes the second motor 20 to stop rotating (S23). The operation and effects of the balance control will be described below.

[Operation of Walking Assist Device]

Next, the operation of the Talking assist device 1 will be described with reference to FIGS. 11 to 15.

(Standstill State to Power-ON State)

Figure 11:
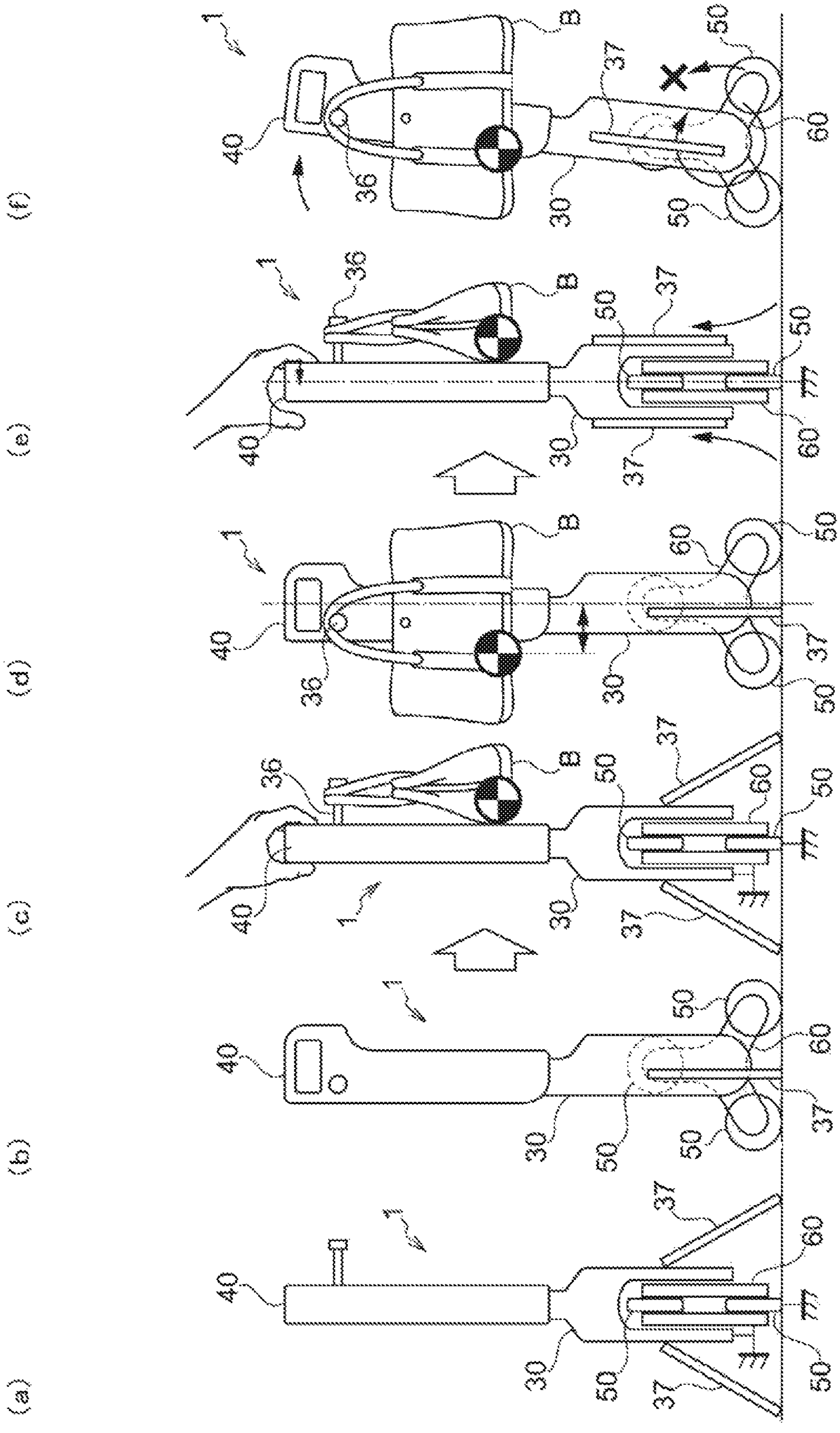
FIG. 11 is a diagram illustrating an operation of the walking assist device according to the embodiment of the present invention, in which (a) is a front view illustrating the walking assist device in a standstill state, (b) is a side view illustrating the walking assist device in the standstill state, (c) is a front view illustrating a state where a bag is hung in the walking assist device in the standstill state, (d) is a side view illustrating the state where the bag is hung in the walking assist device in the standstill state, (e) is a front view illustrating the walking assist device in a power-ON state, (f) is a side view illustrating the walking assist device in the power-ON state.

As illustrated in (a) and (b) of FIG. 11, in the walking assist device 1 in the standstill state (independently stored state), the rotation of the driving wheels 50 two of which are grounded are restricted by the braking mechanism 80 in the power-ON state, the falling of the main body case 30 in the right-left direction is restricted by the stand 37 in the open state, and the irreversible rotation transmission member 110 joins the main body case 30 and the hub case 60 such that the falling of the main body case 30 in the front-rear direction is restricted.

As illustrated in (c) and (d) of FIG. 11, in a case of loading luggage B on the walking assist device 1, the walker operates the hook portion 36 to protrude from the cylindrical portion 35 of the main body case 30, and hangs the luggage B on the hook portion 36 using one hand while supporting the main body case 30 (holding portion 40) using another hand. In a case where the luggage B is hung on the hook portion 36, the center of gravity in the front-rear direction of the walking assist device 1 including the luggage is shifted forward, and the center of gravity in the right-left direction is shifted to any one of the right and left sides. For example, in a case where the walker walks toward the left side of the walking assist device I while holding the holding portion 40 using the right hand, and hangs the luggage B on the right side of the main body case 30, the center of gravity in the right-left direction is shifted to the right side.

As illustrated in (e) and (f) of FIG. 11, walking preparation stage, first, the walker operates the stand 37 using one hand or a foot to enter the closed state while preventing the falling of the main body case 30 (holding portion 40) in the right-left direction using another hand. As a result, the power is turned on, and the traveling assist control and the balance control are started by the controller 120. Once the balance control is started, the controller 120 controls the second motor 20 such that the center of gravity in the front-rear direction of the walking assist device 1 is balanced. As a result, a torque of the second motor 20 is transmitted to the main body case 30 through the balance torque transmission mechanism 100 such that the main body case 30 is tilted rearward.

(Walking Start to Climbing Over of Step)

Figure 12:
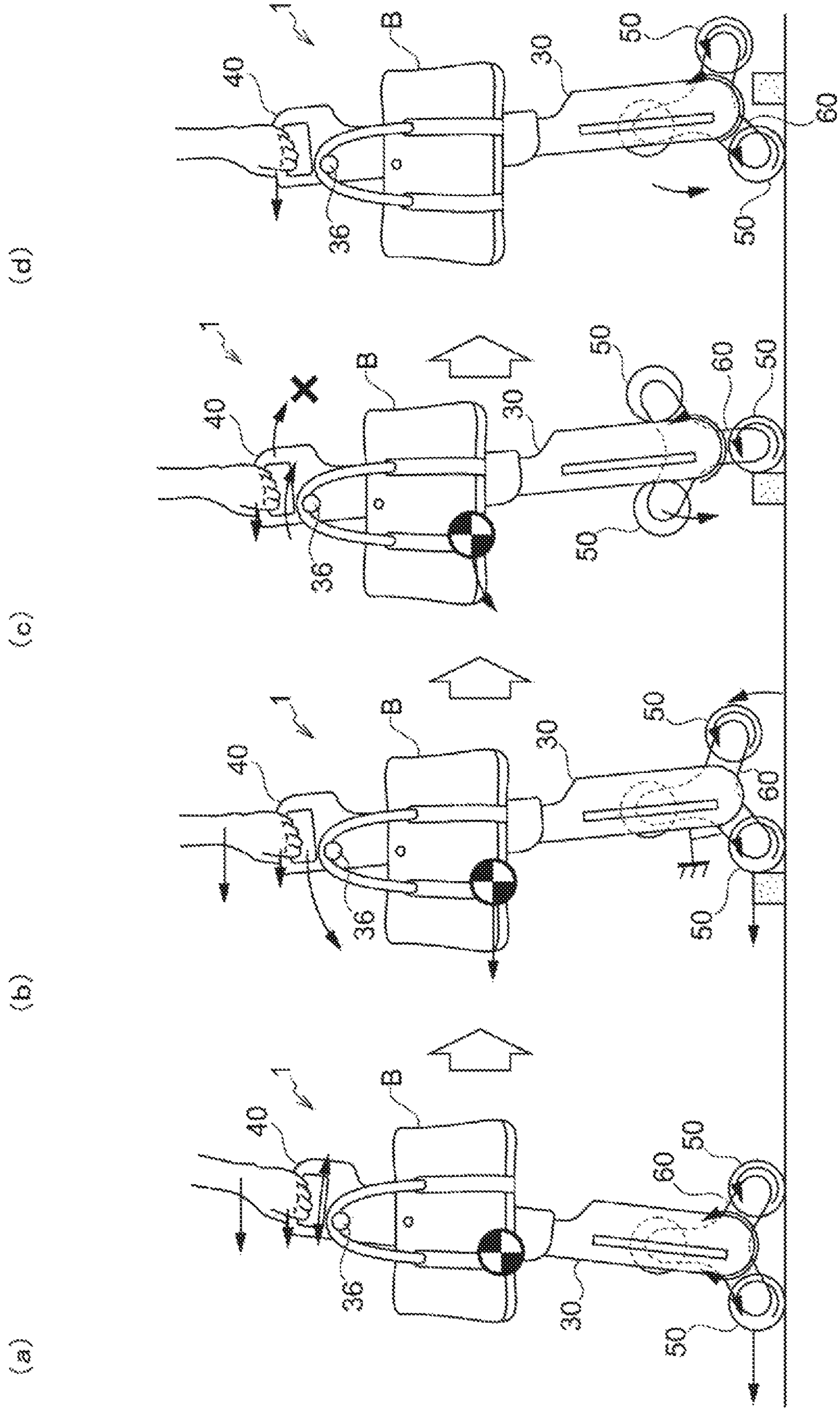
FIG. 12 is a diagram illustrating an operation of the walking assist device according to the embodiment of the present invention, in which (a) is a side view illustrating the walking assist device when starting to walk, (b) is a side view illustrating the walking assist device when falling forward toward a step, (c) is a side view illustrating the walking assist device when starting to climb over the step, and (d) is a side view illustrating the walking assist device while climbing over the step.

As illustrated in (a) of FIG. 12, in a case where the walker starts walking, the walker transmits a force to the holding portion 40 such that the walking assist device 1 moves forward (forward pushing operation). In a case where the controller 120 obtains "walking" as the intention information of the walker based on a change in detection angle of the main body tilting detection sensor 122, in the traveling assist control, the controller 120 causes braking mechanism 80 to be switched off, and controls the first motor 10 such that the rotation of the driving wheels 50 matches a walking speed of the walker (a speed at which the forward moving force is canceled out). In addition, by the controller 120 controlling the second motor 20 in the balance control, the center of gravity in the front-rear direction of the walking assist device I is continuously balanced.

As illustrated in (b) of FIG. 12, in a case where a leading driving wheel 50 comes into contact with a step that is difficult to climb over by only the rotation of the driving wheels 50 during walking, the main body case 30 falls forward due to an inertial force and the forward moving force of the walker. As described above, in the state where the main body case 30 falls forward, due to the irreversible rotation transmission member 110, the main body case 30 and the hub case 60 are joined to each other, and a state where a trailing driving wheel 50 is floated using the leading driving wheel 50 as a supporting point, among two grounded driving wheels 50 is allowed.

As illustrated in (c) and (d) of FIG. 12, in a case where the main body case 30 falls forward, a torque that causes the main body case 30 to be tilted rearward in the traveling direction is transmitted from the second motor 20 to the main body case 30 through the balance torque transmission mechanism 100. However, in this case, a moment for tilting the main body case 30 forward is larger than a moment for tilting the main body case 30 rearward using the torque of the second motor 20. Therefore, by a reaction, the hub case 60 rotates forward, and the plurality of driving wheels 50 revolve. Thus, the walking assist device 10 can climb over the step.

(Stop)

Figure 13B:
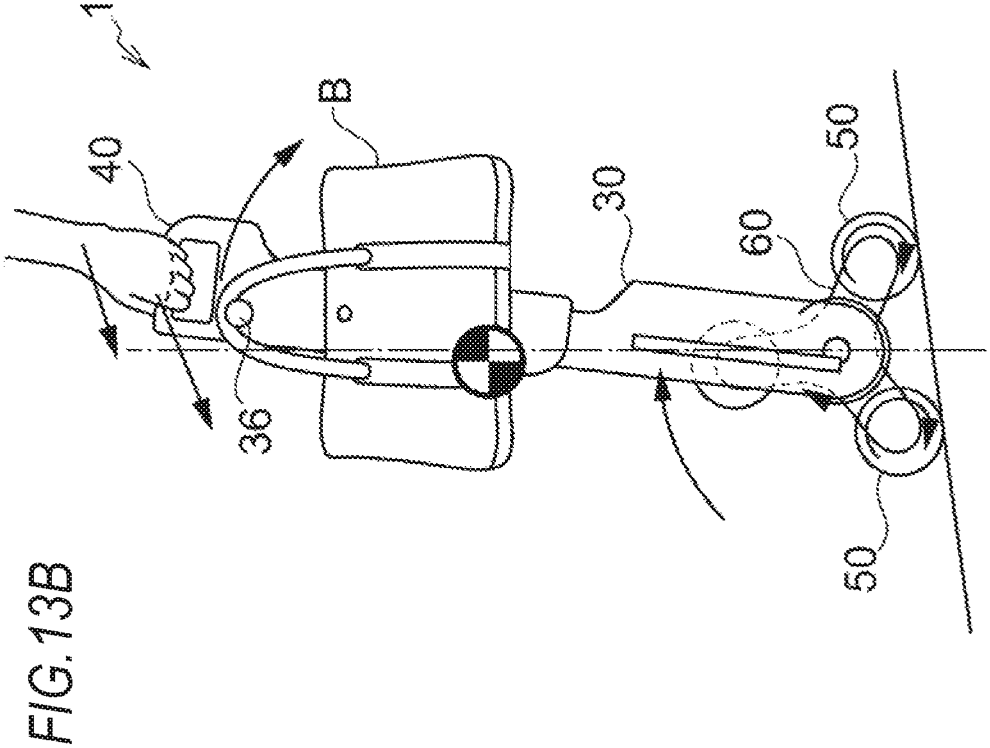
FIG. 13B is a side view illustrating the walking assist device according to the embodiment of the present invention when going down a downhill road.
Figure 13A:
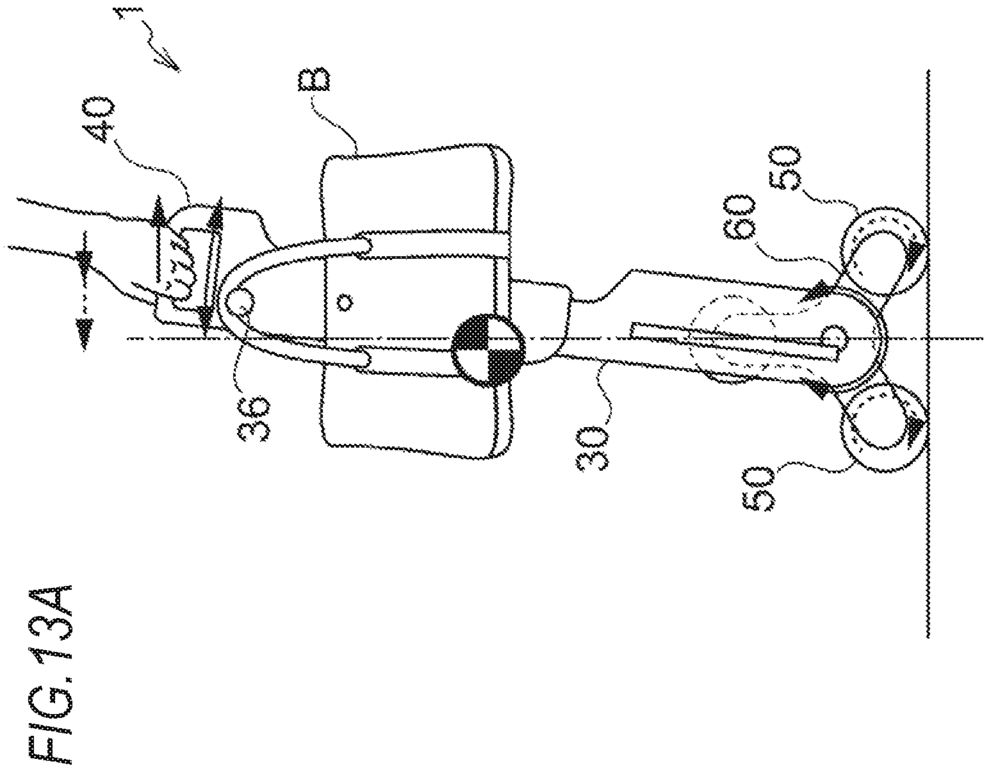
FIG. 13A is a side view illustrating the walking assist device according to the embodiment of the present invention that transitions from a walking state to a stopped state.

As illustrated in FIG. 13A, in a case where the walker tries to stop walking, the walker transmits a force to the holding portion 40 such that the walking assist device 1 stops (rearward pulling operation). In a case where the controller 120 obtains "stop" as the intention information of the walker based on a change in detection angle of the main body tilting detection sensor 122, in the traveling assist control, the controller 120 causes the first motor 10 to be regeneratively driven such that the rotation of the driving wheels 50 is decelerated and the rotation of the driving wheels 50 is stopped. In addition, by the controller 120 controlling the second motor 20 in the balance control, the center of gravity in the front-rear direction of the walking assist device 1 is continuously balanced.

(Downhill Road)

As illustrated in FIG. 13B, in a case where the driving wheels 50 go down a downhill road, the center of gravity in the front-rear direction of the walking assist device 1 is continuously balanced by the controller 120 controlling the second motor 20 in the balance control. As a result, the main body case 30 is tilted rearward with respect to the walkway. In addition, in the traveling assist control, the controller 120 determines that the walking assist device 1 is positioned on the downhill road based on a detection angle of the rotation angle sensor 124, causes the first motor 10 to be regeneratively driven such that the rotation of the driving wheels 50 is decelerated, and causes the rotation of the driving wheels 50 to match with a walking speed of the walker.

(Going Up Stairs)

Figure 14:
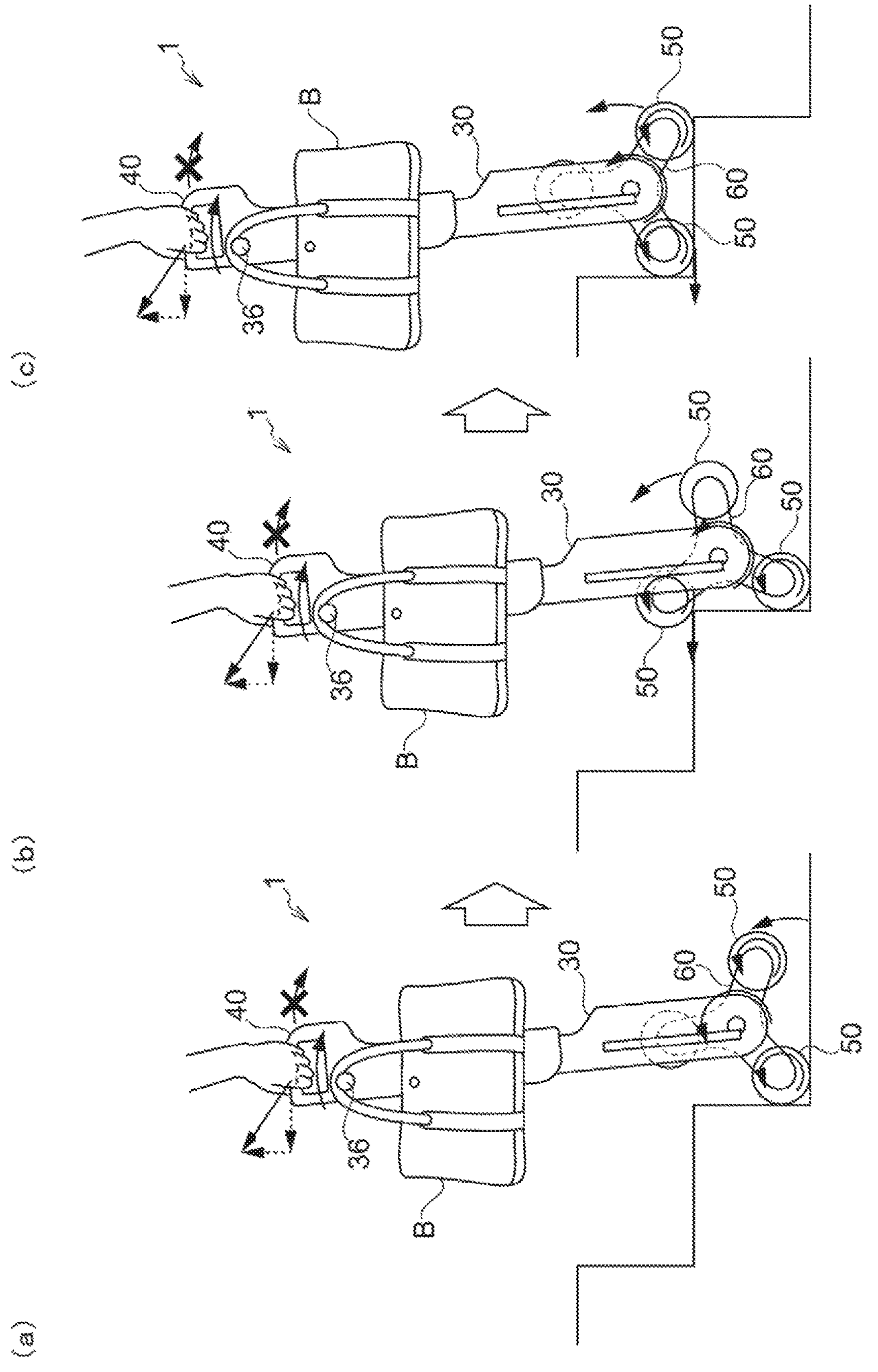
FIG. 14 is a diagram illustrating an operation of the walking assist device according to the embodiment of the present invention, in which (a) is a side view illustrating the walking assist device when starting to go up a stair, (b) is a side view illustrating the walking assist device while going up the stair, and (c) is a side view illustrating the walking assist device after going up the stair.

As illustrated in (a) of FIG. 14, in a case where a leading driving wheel 50 conies into contact with an ascending stair during walking, the main body case 30 falls forward due to an inertial force and the forward moving force of the walker. As described above, in the state where the main body case 30 falls forward, due to the irreversible rotation transmission member 110, the main body case 30 and the hub case 60 are joined to each other, and a state where a trailing driving wheel 50 is floated using the leading driving Wheel 50 as a supporting point, among two grounded driving wheels 50, is allowed.

As illustrated in (b) of FIG. 14, in a case where the main body case 30 is tilted forward due to forward-falling, a torque that causes the main body case 30 to be tilted rearward in the traveling direction is transmitted from the second motor 20 to the main body case 30 through the balance torque transmission mechanism 100. However, in this case, a moment for tilting the main body case 30 forward is larger than a moment for tilting the main body case 30 rearward using the torque of the second motor 20. Therefore, by a reaction, the hub case 60 rotates forward, and the plurality of driving wheels 50 revolve. As a result, one driving wheel 50 lands on the top of the ascending stair. Once the driving wheel 50 lands on the top of the ascending stair, the walking assist device 1 goes up the top of the ascending stair due to a torque of the driving wheels 50, a torque of the hub case 60, and the force of the walker to go up the stair.

As illustrated in (c) of FIG. 14, once the walking assist device 1 goes up to the top of the ascending stair, a leading driving wheel 50 comes into contact with the top of the next ascending stair, and the operation illustrated in (a) and (b) of FIG. 14 is repeated. As a result, the walking assist device 1 can go up a plurality of ascending stairs.

(Going Down Stairs)

Figure 15:
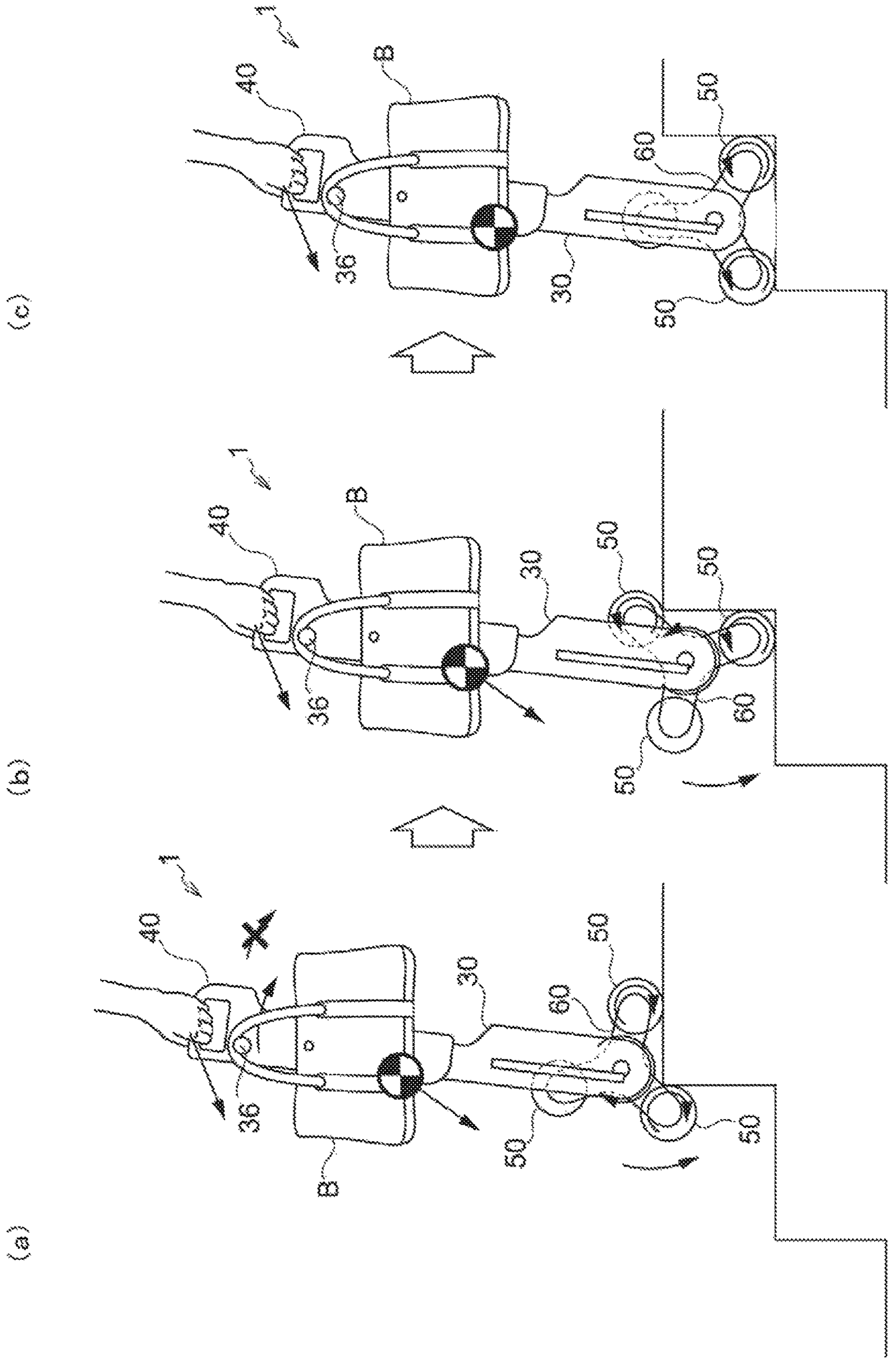
FIG. 15 is a diagram illustrating an operation of the walking assist device according to the embodiment of the present invention, in which (a) is a side view illustrating the walking assist device when starting to go down a stair, (b) is a side view illustrating the walking assist device while going down the stair, and (c) is a side view illustrating the walking assist device after going down the stair.

As illustrated in (a) of FIG. 15, in a case where a leading driving wheel 50 reaches a descending stair during walking, the leading driving wheel 50 falls off from a step. At this time, only a trailing driving wheel 50 functions as a supporting point, and the center of gravity in the front-rear direction is shifted forward. Therefore, a torque that causes the main body case 30 to be tilted rearward in the traveling direction is transmitted from the second motor 20 to the main body case 30 through the balance torque transmission mechanism 100. At this time, due to the forward moving force and the weight of the luggage B, a moment for tilting the main body case 30 forward is larger than a moment for tilting the main body case 30 rearward using the torque of the second motor 20. Therefore, by a reaction, the hub case 60 rotates forward, and the plurality of driving wheels 50 revolve. As a result, the walking assist device 1 starts to go down the descending stair.

As illustrated in (b) and (c) of FIG. 15, once one driving wheel 50 lands on the bottom of the stair, the hub case 60 rotates forward such that a state is returned to the state where two driving wheels 50 are grounded. Next, once the leading driving wheel 50 falls off from a step of the next descending stair, the operation illustrated in (a) and (b) of FIG. 15 is repeated. As a result, the walking assist device 1 can go down a plurality of descending stairs.

[Effects of Embodiment]

As described above, the walking assist device 1 according to the embodiment includes the plurality of driving wheels 50 that can rotate and revolve according to the driving of the first motor 10 and the second motor 20. Therefore, the movement in the traveling direction is assisted due to the rotation of the plurality of driving wheels 50, and the walking assist device 1 can be adapted to various walkways (for example, can climb over a step or can go up and down stairs) due to the revolution of the plurality of driving wheels 50.

In addition, the controller 120 controls the first motor 10 such that movement in the traveling direction of the walking assist device 1 is assisted, and controls the second motor 20 such that the center of gravity in the traveling direction of the walking assist device 1 is balanced. Therefore, the movement of the walker can be assisted while reducing a load applied to the walker.

In addition, the irreversible rotation transmission member 110 including the input shaft 111, the output shaft 112, and the outer ring member 113 is provided on the power transmission path from the second motor 20 to the hub case 60 and the main body case 30; a torque of the input shaft 111 is transmitted to the output shaft 112; a torque of the output shaft 112 is transmitted to the outer ring member 113 without being transmitted to the input shaft 111; in a state where the output shaft 112 is fixed, the input shaft 111 does not rotate and rotation of the outer ring member 113 is allowed; the stator 22 of the second motor 20 is connected to the input shaft 111; the main body case 30 is connected to the output shaft 112; and the hub case 60 is connected to the outer ring member 113 through the rotor 23 of the second motor 20. Therefore, a torque of the second motor 20 can be selectively transmitted to the hub case 60 and the main body case 30 according to the circumstances without performing an electrical clutch control.

In addition, the first motor 10 and the second motor 20 are disposed outside of a revolution circumferential track of the plurality of driving wheels 50 supported by the hub case 60. Therefore, an increase in size in the width direction of the walking assist device 1 can be suppressed, and the manageability and designability of the walking assist device 1 can be improved.

In addition, the revolution torque transmission mechanism 90 is disposed on one side in the width direction of the walking assist device 1, the balance torque transmission mechanism 100 is disposed on another side in the width direction of the walking assist device 1, and the plurality of driving wheels 50 and the rotation torque transmission mechanism 70 are disposed between the revolution torque transmission mechanism 90 and the balance torque transmission mechanism 100. Therefore, the plurality of driving wheels 50 can be disposed in the vicinity of the center in the width direction of the walking assist device 1, and the balance in the width direction of the walking assist device 1 can be improved.

In addition, one of the upstream side rotation torque transmission mechanism 71 and the downstream side rotation torque transmission mechanism 72 is disposed between the revolution torque transmission mechanism 90 and the plurality of driving wheels 50, and another one of the upstream side rotation torque transmission mechanism 71 and the downstream side rotation torque transmission mechanism 72 is disposed between the balance torque transmission mechanism 100 and the plurality of driving wheels 50. Therefore, the balance in the width direction of the walking assist device 1 can further be improved.

In addition, the walking assist device I includes the braking mechanism 80 for stopping the rotation of the plurality of driving wheels 50. Therefore, the movement of the walking assist device 1 can be reliably stopped.

In addition, the main body case 30 includes the hook portion 36 for hanging the luggage B. Therefore, in a state where the luggage B is hung, the movement of the walker can be assisted, and the center of gravity in the traveling direction of the walking assist device 1 can be balanced. As a result, a load of the luggage B on the walker can be reduced.

In addition, the main body tilting detection sensor 122 or the operation lever 41 for obtaining the intention information regarding the movement of the walker is provided in the holding portion 40. Therefore, the walker can transmit the intention regarding the movement to the walking assist device 1 through the main body tilting detection sensor 122 or the operation lever 41 of the holding portion 40.

In addition, in the revolution circumferential track of the plurality of driving wheels 50 supported by the hub case 60, the first motor 10 and the second motor 20 are disposed between one end portion and another end portion in the traveling direction of the walking assist device 1. Therefore, an increase in size in the traveling direction of the walking assist device 1 can be suppressed.

In addition, in the main body case 30, due to the disposition configuration of each of the accommodation portions, the first motor 10, the second motor 20, the revolution torque transmission mechanism 90, the balance torque transmission mechanism 100, the holding portion 40, the battery 130, the hub case 60, and the plurality of driving wheels 50 can be compactly disposed with a good balance.

Further, in the method of controlling the walking assist device 1 according to the embodiment, the walking assist device 1 can be moved in the traveling direction according to the intention information regarding the movement of the walker, in which the walking assist device 1 includes the plurality of driving wheels 50 that can rotate and revolve according to the driving of the first motor 10 and the second motor 20, and can be adapted to various walkways due to the revolution of the plurality of driving wheels 50.

In addition, the second motor 20 is controlled such that the center of gravity in the traveling direction of the walking assist device 1 is balanced. Therefore, the movement of the walker can be assisted while reducing a load applied to the walker.

In addition, in a case where the driving wheels 50 come into contact with a step that is difficult to climb over, the main body case 30 is tilted forward to enter into a state where the main body case 30 and the hub case 60 are joined to each other, and a state where a trailing driving wheel 50 is floated using a leading driving wheel 50 as a supporting point, among two grounded driving wheels 50, is allowed. A moment for tilting the main body case 30 forward is set to be larger than a moment for tilting the main body case 30 rearward using a torque that is output from the second motor 20 and causes the main body case 30 to be tilted rearward in the traveling direction. As a result, the hub case 60 rotates and the plurality of driving wheels 50 revolve by a reaction of the torque. Therefore, the walking assist device 1 can climb over the step.

In addition, in a case where the driving wheels 50 go down a downhill road, the first motor 10 is regeneratively driven such that the rotation of the driving wheels 50 is decelerated and the rotation of the driving wheels 50 is matched with a walking speed of the walker. Therefore, the acceleration of the walking assist device 1 on the downhill road can be suppressed, and a weight load of the walker applied forward can also be received.

In addition, in a case where the walker tries to stop, the first motor 10 is regeneratively driven such that rotation of the driving wheels 50 is decelerated and the rotation of the driving wheels 50 is stopped. Therefore, the walking assist device I can be smoothly stopped according to a walking speed of the walker.

In addition, in a case where the walker go up stairs, the main body case 30 is tilted forward to enter into a state where the main body case 30 and the hub case 60 are joined to each other, a state where a trailing driving wheel 50 is floated using a leading driving wheel 50 as a supporting point, among two grounded driving wheels 50, is allowed. A moment for tilting the main body case 30 forward is set to be larger than a moment for tilting the main body case 30 rearward using a torque that is output from the second motor 20 and causes the main body case 30 to be tilted rearward in the traveling direction. As a result, the hub case 60 rotates and the plurality of driving wheels 50 revolve by a reaction of the torque. Therefore, the walking assist device 1 can go up the stairs.

In addition, in a case where the walker tries to go down stairs, a leading driving wheel 50 falls off from a step, and only a trailing driving wheel 50 functions as a supporting point. A moment for tilting the main body case 30 forward is set to be larger than a moment for tilting the main body case 30 rearward using a torque that is output from the second motor 20 and causes the main body case 30 to be tilted rearward in the traveling direction. As a result, the hub case 60 rotates and the plurality of driving wheels 50 revolve by a reaction of the torque. Therefore, the walking assist device 1 can go down the stairs.

The present invention is not limited to the above-described embodiment, and appropriate modifications, improvements, and the like can be made.

The invention claimed is:

1. A walking assist device for assisting movement of a human walker, comprising:
- a first motor;
- a second motor;
- a main body case that accommodates the first motor and the second motor;
- a holding portion that is provided in the main body case and is held by the walker;
- a plurality of driving wheels, each of which is rotatable around a rotating shaft provided on a circumference in common, and
- a controller that controls the first motor and the second motor according to intention information regarding the movement of the walker, wherein
- a sensor device or an input device for obtaining the intention information regarding the movement of the walker is provided in the holding portion,
- the plurality of rotating shafts are rotatably supported by a hub case,
- the hub case is supported by the main body case to be rotatable around a center of the plurality of rotating shafts as a pivot,
- the first motor is connected to the plurality of driving wheels to be capable of transmitting power,
- the second motor is connected to the hub case to be capable of transmitting power and is connected to the main body case to be capable of transmitting power, and
- the controller controls the first motor such that movement in a traveling direction of the walking assist device is assisted, and controls the second motor such that a center of gravity in the traveling direction of the walking assist device is balanced.

2. The walking assist device according to claim 1, wherein
- an irreversible rotation transmission member is provided on a power transmission path from the second motor to the hub case and the main body case,
- the irreversible rotation transmission member comprises an input shaft, an output shaft, and an outer ring member,
- a torque of the input shaft is transmitted to the output shaft,
- a torque of the output shaft is transmitted to the outer ring member without being transmitted to the input shaft,
- in a state where the output shaft is fixed, the input shaft does not rotate and rotation of the outer ring member is allowed,
- a stator of the second motor is connected to the input shaft,
- the main body case is connected to the output shaft, and
- the hub case is connected to the outer ring member through a rotor of the second motor.

3. The walking assist device according to claim 1, wherein
- the first motor and the second motor are disposed outside of a revolution circumferential track of the plurality of driving wheels supported by the hub case.

4. The walking assist device according to claim 1, further comprising:
- a rotation torque transmission mechanism that transmits a torque from the first motor to the plurality of driving wheels;
- a revolution torque transmission mechanism that transmits a torque from the second motor to the hub case; and
- a balance torque transmission mechanism that transmits the torque from the second motor to the main body case, wherein
- when seen from the traveling direction of the walking assist device,
- the revolution torque transmission mechanism is disposed on a first side in a width direction of the walking assist device,
- the balance torque transmission mechanism is disposed on a second side that is opposite to the first side in the width direction of the walking assist device, and
- the plurality of driving wheels and the rotation torque transmission mechanism are disposed between the revolution torque transmission mechanism and the balance torque transmission mechanism.

5. The walking assist device according to claim 4, wherein
- in the rotation torque transmission mechanism, an upstream side rotation torque transmission mechanism and a downstream side rotation torque transmission mechanism are connected to each other to be capable of transmitting power through a through shaft that passes through the pivot of the hub case, and
- when seen from the traveling direction of the walking assist device,
- the plurality of driving wheels are provided substantially at a center in the width direction of the walking assist device, one of the upstream side rotation torque transmission mechanism and the downstream side rotation torque transmission mechanism is disposed between the revolution torque transmission mechanism and the plurality of driving wheels, and another one of the upstream side rotation torque transmission mechanism and the downstream side rotation torque transmission mechanism is disposed between the balance torque transmission mechanism and the plurality of driving wheels.

6. The walking assist device according to claim 1, further comprising:

a braking mechanism for stopping rotation of the plurality of driving wheels.

7. The walking assist device according to claim 1, wherein the main body case comprises a hook portion for hanging luggage.

8. The walking assist device according to claim 1, wherein in the traveling direction of the walking assist device, the first motor and the second motor are disposed between one end portion and another end portion in a revolution circumferential track of the plurality of driving wheels supported by the hub case.

9. The walking assist device according to claim 4, wherein the main body case comprises a motor accommodation portion that accommodates the first motor and the second motor, a revolution torque transmission mechanism accommodation portion that is connected to the first side of the motor accommodation portion in the width direction and accommodates the revolution torque transmission mechanism, a balance torque transmission mechanism accommodation portion that is connected to the second side of the motor accommodation portion in the width direction and accommodates the balance torque transmission mechanism, and a cylindrical portion that connects the holding portion and an upper portion of the motor accommodation portion to each other, a battery that is electrically connected to the first motor and the second motor is disposed in the cylindrical portion, and the plurality of driving wheels supported by the hub case are disposed below the motor accommodation portion and between the revolution torque transmission mechanism accommodation portion and the balance torque transmission mechanism accommodation portion in the width direction of the walking assist device.

* * * * *